United States Patent
Jang

(10) Patent No.: US 9,813,942 B2
(45) Date of Patent: Nov. 7, 2017

(54) INTER-RAT SYSTEMS ACCESS NETWORK (AN) LOAD BALANCE AND CONGESTION CONTROL MECHANISM

(71) Applicant: TELEFONAKTIEBOLAGET L M ERICSSON (PUBL), Stockholm (SE)

(72) Inventor: Ke-Chi Jang, Plano, TX (US)

(73) Assignee: Telefonaktiebolaget LM Ericsson(publ), Stockholm (SE)

( * ) Notice: Subject to any disclaimer, the term of this patent is extended or adjusted under 35 U.S.C. 154(b) by 0 days.

(21) Appl. No.: 15/017,935

(22) Filed: Feb. 8, 2016

(65) Prior Publication Data

US 2016/0174104 A1 Jun. 16, 2016

Related U.S. Application Data

(62) Division of application No. 14/031,633, filed on Sep. 19, 2013, now Pat. No. 9,288,717.

(60) Provisional application No. 61/757,814, filed on Jan. 29, 2013.

(51) Int. Cl.
  *H04W 28/08* (2009.01)
  *H04W 48/06* (2009.01)
  *H04W 36/14* (2009.01)
  *H04W 88/06* (2009.01)

(52) U.S. Cl.
  CPC .......... *H04W 28/08* (2013.01); *H04W 48/06* (2013.01); *H04W 36/14* (2013.01); *H04W 88/06* (2013.01)

(58) Field of Classification Search
  CPC ...... H04W 28/08; H04W 36/14; H04W 48/06
  See application file for complete search history.

(56) References Cited

U.S. PATENT DOCUMENTS

| 2008/0233955 A1 | 9/2008 | Narang et al. |
| 2008/0254812 A1 | 10/2008 | Kitazoe |
| 2009/0088160 A1 | 4/2009 | Pani et al. |

(Continued)

FOREIGN PATENT DOCUMENTS

EP  2 114 102 A2  11/2009

OTHER PUBLICATIONS

ZTE eta. Idle Load Balancing Between eHRPD and L TE. 3GPP2 Draft.11 Dec. 2012 (Dec. 11, 2012).

(Continued)

*Primary Examiner* — Liton Miah

(57) ABSTRACT

A system and method to perform load-balancing and congestion control between a primary Radio Access Technology (RAT) and a secondary RAT. A broadcast message is sent to all User Equipments (UEs) operating under the secondary RAT. If the primary RAT is congested, a congestion indicator in the broadcast message prevents the UEs from idle re-selecting or switching to the primary RAT. Even if the primary RAT is not congested, the broadcast message may still include other parameters such as one or more probability values, a group identifier for the UE groups, and a retention timer. The idle UEs in the secondary RAT that generate device-specific random values that are equal to or greater than the applicable probability threshold value(s) are allowed to reselect the primary RAT. If an idle UE fails this probability test, it may not be allowed to reselect the primary RAT again until the retention timer expires.

6 Claims, 8 Drawing Sheets

(56) References Cited

U.S. PATENT DOCUMENTS

| | | | |
|---|---|---|---|
| 2009/0176496 A1* | 7/2009 | Li | H04L 12/5695 |
| | | | 455/437 |
| 2011/0081887 A1* | 4/2011 | Chakraborty | H04W 48/02 |
| | | | 455/410 |
| 2011/0250891 A1 | 10/2011 | Zou et al. | |
| 2012/0064896 A1 | 3/2012 | Guo et al. | |
| 2012/0108241 A1 | 5/2012 | Wu | |
| 2013/0095879 A1* | 4/2013 | Gupta | H04W 76/027 |
| | | | 455/525 |
| 2013/0203452 A1 | 8/2013 | Awoniyi et al. | |
| 2013/0250784 A1 | 9/2013 | Mandadapu et al. | |
| 2013/0303176 A1* | 11/2013 | Martin | H04W 76/027 |
| | | | 455/450 |
| 2013/0337814 A1* | 12/2013 | Wong | H04W 48/20 |
| | | | 455/438 |

OTHER PUBLICATIONS

E-UTRAN-cdma2000 HRPD Connectivity and Interworking Air Interface Specification. 3GPP2 Draft; C.S0087-A, Jun. 6, 2013 (Jun. 6, 2013).

Ericsson. Ericsson R&F Comment to C.S0087-A v3.0 Regarding Reselection Probability. 3GPP2 Draft; AC22-20130717-003 ERICSSON. Sep. 9, 2013 (Sep. 9, 2013).

3GPP2. E-UTRAN-cdman2000 HRPD Connectivity and Interworking: Air Interface Specification; Revision 0 v2.0. 3GPP2 C.S0087-0 v2.0. Jan. 2010.

* cited by examiner

INTER-RAT SYSTEMS ACCESS NETWORK (AN) LOAD BALANCE AND CONGESTION CONTROL MECHANISM

CROSS-REFERENCE TO RELATED APPLICATIONS

This application is a divisional of co-pending U.S. application Ser. No. 14/031,633 filed on Sep. 19, 2013 which claims the priority benefit under 35 U.S.C. §119(e) of U.S. Provisional Application No. 61/757,814 filed on Jan. 29, 2013, the disclosure of which is incorporated herein by reference in its entirety.

TECHNICAL FIELD

The present disclosure generally relates to Radio Resource Management (RRM) in a mobile communication system. More particularly, and not by way of limitation, particular embodiments of the present disclosure are directed to a system and method for inter-Radio Access Technology (RAT) load-balancing and congestion control using a broadcast message, wherein the broadcast message includes either a congestion indicator for network-controlled idle re-selection (or redirect) of a primary RAT or a group-agnostic probability threshold value to control idle re-selection of the primary RAT independent of the grouping of wireless devices.

BACKGROUND

Modern wireless networks are heterogeneous in nature where different Radio Access Technologies (RATs) co-exist in the same coverage area. The co-existence of different RATs requires improved Radio Resource Management (RRM) to support the provision of pre-defined Quality of Service (QoS) and efficient utilization of radio resources. The RRM can dynamically manage the allocation and de-allocation of radio resources between different RATs, allowing seamless transition from one RAT to another when a wireless device is enabled for multi-mode operation.

FIG. 1 illustrates an exemplary network configuration 10 showing a heterogeneous wireless network 11 containing two different Radio Access Networks (RANs) 12, 14, wherein each RAN supports a corresponding different RAT. The network 11 may be a cellular telephone network operated, managed, owned, or leased by a wireless/cellular service provider (or operator). As can be seen from FIG. 1, two different RATs 12, 14 may co-exist within the same operator network or geographical coverage area. Each RAT may be supported by its corresponding RAN, which provides radio interface to a wireless device 16 to enable the device 16 to communicate with various entities (not shown) in the operator network 11 (and beyond) using a device-selected RAT. In FIG. 1, such radio interface is symbolically depicted by the exemplary wireless links 18 and 19. The operator network 11 may be coupled to a centralized RRM unit 20 via an Internet Protocol (IP) network (such as, for example, the Internet) 22. The RRM unit 20 may dynamically manage the allocation and de-allocation of radio resources between different RATs 12, 14. As mentioned before, in a heterogeneous network, different RATs co-exist in the same coverage area. Thus, instead of performing the management of radio resources independently for each RAT, the network operator may opt for an RRM 20 to provide a centralized form of overall and global management of the pool of radio resources to support the provision of QoS for wireless devices and efficient utilization of radio resources. The RRM unit 20 may be part of a group of operator-specific software modules (or applications) residing in and accessible through the IP network 22. Although not shown in FIG. 1, the RANs 12, 14 may be coupled to a Core Network (CN) portion of the operator's network 11. In one embodiment, a common CN functionality may be shared between the two RANs 12, 14. Alternatively, each RAN 12, 14 may have its own associated CN, and some form of interworking may be employed to link the two RAN-specific core networks.

In case of cellular access, the term "Access Network" (AN) may include not only a RAN portion (comprising, for example, a base station with or without a base station controller) of a cellular carrier network (e.g., the network 11), but other portions such as a cellular backhaul and core network as well. A cellular RAN such as the RANs 12, 14 may include multiple cell sites (not shown), each under the radio coverage of a respective Base Station (BS) or Base Transceiver Station (BTS) (not shown). The base stations may be, for example, evolved NodeBs (eNodeBs or eNBs), high power and macro-cell base stations or relay nodes, etc. These base stations may receive wireless communication (as indicated by exemplary radio links 18-19) from the wireless terminal 16 (and other such terminals operating in the network 11), and forward the received communication to a respective Core Network (CN). The wireless terminals may use suitable RATs (examples of which are given later below) to communicate with the base stations in the RAN. In case of a Third Generation (3G) RAN, for example, the cellular backhaul (not shown) may include functionalities of a 3G Radio Network Controller (RNC) or Base Station Controller (BSC). Portions of the backhaul (such as, for example, BSC's or RNC's) together with base stations may be considered to comprise the RAN portion of the network. The Core Network (CN), on the other hand, may provide logical, service, and control functions (e.g., subscriber account management, billing, subscriber mobility management, etc.), Internet Protocol (IP) connectivity and interconnection to other networks (e.g., the Internet or the Internet-based service network 22) or entities, roaming support, etc. The CN may be, for example, an International Mobile Telecommunications (IMT) CN such as a Third Generation Partnership Project (3GPP) CN or a 3GPP2 CN (for Code Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

From the above, it is observed that the term "RAT" signifies a specific radio access technology used by the wireless device 16 while communicating with a given "RAN." Whereas, the term "RAN" refers to a portion (including hardware and software modules) of the service provider's AN that facilitates voice calls, data transfers, and multimedia applications (e.g., Internet access, online gaming, content downloads, video chat, etc.) for the wireless device 16. Despite such clear technical distinctions between a "RAN" and a "RAT," these two terms still remain technically closely-linked or intertwined. Therefore, these terms may be used interchangeably herein for ease of discussion. Thus, for example, a sentence like "The wireless device is operating in the secondary RAT" is in fact a shorthand version of the technically more accurate sentence: "The wireless device is operating in the secondary RAN (and communicating with that RAN using the secondary RAT)." The interchangeable use of the terms "RAN" and "RAT" may slightly sacrifice such technical accuracy, but the desired meaning is suitably conveyed through the context of discussion. However, if the context of discussion below requires more clarity, the term "RAN" may be specifically used instead of "RAT." It is also understood that although a RAN may support more than one RAT, for ease of discussion below, it may be assumed that each RAN 12, 14 supports only one corresponding RAT. However, the applicability of the teachings of the present disclosure is not limited to such one-to-one correspondence between a RAN and a RAT.

Some exemplary RANs include RANs in Third Generation Partnership Project's (3GPP) Global System for Mobile communications (GSM), Universal Mobile Telecommunications System (UMTS), Long Term Evolution (LTE), and LTE Advanced (LTE-A) networks. These RANS include, for example, GERAN (GSM/EDGE RAN, where "EDGE" refers to Enhanced Data Rate for GSM Evolution systems), Universal Terrestrial Radio Access Network (UTRAN), and Evolved-UTRAN (E-UTRAN). The corresponding RATs for these 3GPP networks are: GSM/EDGE for GERAN, UTRA for UTRAN, E-UTRA for E-UTRAN, and Wideband Code Division Multiple Access (WCDMA) based High Speed Packet Access (HSPA) for UTRAN or E-UTRAN. Similarly, Evolution-Data Optimized (EV-DO) based evolved Access Network (eAN) is an exemplary RAN in 3GPP2's Code Division Multiple Access (CDMA) based systems, and its corresponding RATs are 3GPP2's CDMA based High Rate Packet Data (HRPD) or evolved HRPD (eHRPD) technologies. As another example, HRPD technology or Wireless Local Area Network (WLAN) technology may be used as RATs for a Worldwide Interoperability for Microwave Access (WiMAX) RAN based on Institute of Electrical and Electronics Engineers (IEEE) standards such as, for example, IEEE 802.16e and 802.16m.

In case of a 3GPP network such as an LTE network, the wireless device 16 may be a User Equipment (UE) or a Mobile Station (MS). In case of an HRPD network, the wireless device 16 may be an Access Terminal (AT) (or evolved AT). Generally, the wireless device 16 (also referred to by various analogous terms such as "mobile handset," "wireless handset," "terminal," etc.) may be any multi-mode mobile handset enabled (e.g., by the device manufacturer or the network operator) for communications over the primary and the secondary RATs. Some examples of such mobile handsets/devices include cellular telephones or data transfer equipments (e.g., a Personal Digital Assistant (PDA) or a pager), smartphones (e.g., iPhone™, Android™ phones, Blackberry™, etc.), handheld or laptop computers, Bluetooth® devices, electronic readers, portable electronic tablets, etc. For the sake of simplicity, in the discussion herein, the term "UE" may be primarily used as representative of all such wireless devices (i.e., AT's, MS's, or other mobile terminals), regardless of the type (i.e., whether a 3GPP system, a 3GPP2 system, etc.) of the primary and secondary RANs/RATs.

For ease of discussion of inter-RAT load balancing, one RAT is considered as a "primary" RAT whereas the other RAT is considered as a "secondary" RAT. Thus, for example, in FIG. 1, the primary RAT is identified by reference numeral "12" whereas the secondary RAT is identified by reference numeral "14." It is noted here that the "primary" and "secondary" designations do not imply that the secondary RAT is somehow inferior to or less preferred than the primary RAT. Rather, the term "primary" is generally used to refer to a RAT that a wireless device (e.g., the device 16 in FIG. 1) is programmed (or provisioned) (e.g., by the operator of the network 11) to camp on (in an idle state) or switch to (in an active state) whenever the device receives wireless communication from that RAT. Thus, for example, when the wireless device 16 is in the coverage area of the secondary RAT 14 (and receives wireless communication from the secondary RAT 14), but also receives signals from the primary RAT 12, the wireless device 16 may attempt to camp on the primary RAT 12 when the device is in an idle state (i.e., no traffic channel established over the secondary RAT 14) or may attempt to switch to the primary RAT 12 when the wireless device is in an active state (i.e., a traffic channel established over the secondary RAT 14). In other words, a "primary" RAT may be considered as a RAT that a wireless device prefers to use first if it has a choice.

As an example, the "primary" RAN/RAT 12 may be LTE E-UTRAN, whereas its corresponding "secondary" RAN/RAT 14 may be EV-DO based eAN, and vice versa. Although not shown in FIG. 1, in certain cases, geographical coverage areas of the two RANs/RATs may partially or significantly overlap. In some implementations, the primary RAN/RAT may be entirely within the geographical area covered by the secondary RAN/RAT, and vice versa. For example, in a city-wide network, LTE may be chosen for urban coverage, whereas the entire network itself may be an EV-DO network. Thus, in the urban portion, the LTE network may be entirely within the larger EV-DO network. Many other such combinations of primary and secondary RANs/RATs may be envisaged. Thus, although primary and secondary RANs/RATs 12, 14 are shown in a non-overlapping configuration in FIG. 1, it is understood that the teachings of the present disclosure apply to other configurations of these RATs as well (e.g., full overlap, partial overlap, etc.).

As mentioned earlier, in many implementations, the UEs select to camp on their primary RAT whenever possible. This may create load imbalance if the system has primary and secondary RATs "overlaid" (e.g., when the primary RAT's geographical coverage area is entirely within the secondary RAT's geographical coverage area). Also, in some situations, the primary RAT may be congested, but the overlaid secondary RAT is lightly loaded. The UE may be in the idle state and continue to try to reselect to the primary RAT even when entering the overlaid geographic area (i.e., the area covered by the secondary RAT). This situation may further worsen the congestion issue on the primary RAT.

At present, there are two proposed solutions to address the inter-RAT load imbalance issue mentioned above.

In the first solution, all UEs belonging to the network operator are pre-provisioned into different groups. For example, the operator may have eight groups for all the subscribed UEs. During the initial activation (e.g., activation of a new subscriber account, or the very first time a UE is turned on in the operator network), the operator may assign a group number to a UE, and the group number may be stored in a secure memory location (e.g., in a UE's Subscriber Identity Module (SIM) card). How the operator assigns (or pre-provisions) a group number to each individual subscribing UE is operator dependent. However, in general, the operator may try to evenly distribute the subscribing UEs over all of the pre-defined groups. For example, in case of 1000 UEs and ten (10) groups, each group may be assigned 100 UEs. One way to assign a UE to a group is to assign a group number to the UE based on the last digit of UE's International Mobile Subscriber Identity (IMSI) number.

When the secondary RAN/RAT receives information from the primary RAN/RAT that the primary RAT is getting overloaded, the secondary RAT may broadcast a message (through secondary RAN) to all UEs operating under the secondary RAT. The broadcast message may assign the number "1" to certain groups of UEs and number "0" to the remaining groups of UEs. This enables only those UEs whose groups are assigned the number "1" to camp on the primary RAT. Thus, only the UEs belonging to these "enabled" groups are allowed to reselect the primary RAT (when the UEs are in the idle state) or switch to the primary RAT (when the UEs are in the active state). The UEs belonging to the groups having been assigned the number "0" are not allowed to idle re-select to or switch to the primary RAT, and will remain at secondary RAT.

It is noted here that the terms like "idle reselect" or "idle reselection" or other terms of similar import may be used in the discussion herein to refer to reselection of the primary RAT (as opposed to the continued selection of the current secondary RAT) by a UE that is in an idle state (in the secondary RAT).

This first solution addresses a multi-carrier configuration as well. In the multi-carrier case, each carrier belonging to the primary RAT may be listed in the broadcast message with a carrier-specific probability value. The UE in the enabled group will select a carrier based on the carrier-specific probability value, and also based on any priority value assigned to that carrier.

In the second solution, on the other hand, each UE operating under the secondary RAT (whether in the idle state or the active state) is assigned a priority value by the secondary RAT. The priority value may be assigned, for example, during an initial session establishment or even may be pre-provisioned in the UE (e.g., by the network operator upon initial activation of a subscriber account). When the secondary RAT receives information from the primary RAT that the primary RAT is getting overloaded, the secondary RAT may broadcast a message with a priority threshold. Only UEs with priority values equal to or greater than the priority threshold may be allowed to reselect the primary RAT in their idle state. Furthermore, a probability value may be broadcast along with the priority threshold for a second level of screening of UEs. If this probability value is provided, then the UEs that are eligible to camp on the primary RAT will generate a random value. Only UEs that generate the random value equal to or greater than the broadcasted probability value can eventually idle re-select to the primary RAT.

SUMMARY

There are problems with the two proposed solutions discussed above. The first solution is unfair to the groups that are disabled. Regardless of how the UEs are grouped, when the control mechanism is activated, at any given instance of time, there may be groups of UEs that are denied access (i.e., idle re-select) to the primary RAT. Furthermore, to ensure fairness to all UEs in the secondary RAT, the broadcast message has to be changed frequently to rotate groups to be enabled such that some UEs in each group can have a chance to idle re-select to the primary RAT.

In case of the first solution, if multicarrier randomization function is enabled, then the primary RAT may have to update the secondary RAT with primary RAT's carrier loading information (i.e., the load status of each carrier) because, without this information, the secondary RAT may not be able to set the correct carrier-specific probability value for each primary RAT carrier.

In case of the second solution, another variant of unfairness occurs. When the priority threshold is activated, all the UEs that have priority values lower than the priority threshold are not allowed to idle reselect to the primary RAT. It may be appropriate to have a low priority assigned to certain types of wireless devices (e.g., Machine-to-Machine (M2M) communication devices). However, to satisfy the provisioned QoS for most of the UEs, it may be reasonable to distinguish priority based on the type of the application (e.g., video streaming, real-time conferencing, File Transfer Protocol (FTP) file transfers, etc.) to be used, but it is not a good practice to assign a priority to the UE itself (unless the UE is to be used for National Security (NS) or Emergency Preparedness (EP)). Therefore, the second solution's usage of priority threshold is also unfair to the UEs that have been assigned low priorities—because, at this point in time (i.e., when a priority value is being assigned to a UE), all of the UEs are idle, and there is no application established yet or there is no application-based activity by a UE over the secondary RAT.

Furthermore, to allow UEs with lower priorities to have a chance to idle re-select to the primary RAT under the second solution, the secondary RAT may need to change the priority threshold periodically because, if the broadcast priority threshold is too low, most of the idle UEs will be allowed to reselect the primary RAT, which would defeat the purpose of load-balancing or congestion control.

It is therefore desirable to devise a new approach to inter-RAT load balancing and congestion control, especially in the context of reselection of a primary RAT by idle wireless devices receiving wireless communication over a secondary RAT. It is also desirable to be able to prevent idle or active UEs in the secondary RAT from attempting to reselect or switch to the primary RAT, respectively, especially when the primary RAT is congested.

It is observed here that there may not be a single solution that fits all load balancing and congestion control situations that may exist between a primary RAT and a secondary RAT. However, depending on the situation, a network operator can choose all or a subset of the solutions discussed below to meet the goal the operator intends to achieve.

Particular embodiments of the present disclosure provide for a broadcast message, which may be either a new message or an existing message (with suitable fields added). The broadcast message is used (by the secondary RAN) to broadcast necessary control information to UEs in the secondary RAN to instruct the UEs whether they can idle reselect to the primary RAT or not. The following are examples of possible sub-functions that may be included in the broadcast message from the secondary RAN.

(1) A probability threshold value may be included in the broadcast message. This probability threshold is group-agnostic in the sense that this probability value is common for all UEs and applies to all UEs under the secondary RAT regardless of whether the UEs are divided into different groups or not. If this probability value is set, then all UEs in all groups (if UEs are pre-provisioned into groups) generate UE-specific random values to determine whether the UEs are allowed to idle re-select to the primary RAT. In one embodiment, the UE is considered to have "passed" this probability test if the UE-generated random value is equal to or greater than the common probability threshold value.

A timer may also be included in the broadcast message or may be maintained at the secondary RAN such that if a UE does not pass the probability test, it is not allowed to have another idle reselection attempt during the timer period.

(2) The operator can assign each subscribed UE to a group. There can be a total of N number of groups for the system. Each UE may be assigned to and may belong to one of those N groups. How group is assigned for a UE is dependent on the operator. For example, as mentioned before, the operator can assign a group number to a UE based on the last digit of the IMSI value of the UE. In this approach, there would be a total of ten (10) groups available (for IMSI digits "0" through "9"). The broadcast message may include a group identifier with each group set to "1" (enabled group) or "0" (disabled group). Then, for groups that are set to "1", a probability value may be assigned to each of these groups. In one embodiment, all enabled groups (i.e., group numbers that are set to "1" through the group identifier) may use a common probability threshold. In another embodiment, different enabled groups may use different group-specific probability values instead of a common probability value. The UEs in the enabled groups may then perform the probability test mentioned in sub-part (1) above. Similarly, a timer (like the one mentioned under sub-part (1) above) functionality also may be provided to prevent frequent re-attempts by UEs that fail the probability test.

(3) In one embodiment, the broadcast message may also include a congestion indicator. When the congestion indicator is set to "1", that may indicate to the UEs (receiving the broadcast message from the secondary RAN) that the primary RAT is congested and does not allow any more idle re-selection or switching back from the UEs to the primary RAT.

(4) In an alternative embodiment, even if the congestion indicator is set to "1", the secondary RAN may still be able to activate network-controlled idle re-selection or redirection.

For the idle re-selection case, a UE can send a request to the secondary RAN requesting idle reselection to the primary RAT. The secondary RAN can, based on the subscriber requirements associated with this UE (e.g., pre-provisioned QoS, priority level, type of the current application (e.g., video streaming, real-time conferencing, FTP data transfer), etc.), determine whether it can grant the idle reselection request from the UE. The secondary RAN can then send appropriate message (over the secondary RAT) to the UE either granting or denying the UE's request for idle re-selection.

The redirection case relates to a situation where the UE has a traffic channel established on the secondary RAT. In this case, the UE may send a redirection request (to the secondary RAN) to request switching to the primary RAT. The secondary RAN may grant or deny the request based on the subscriber requirements associated with the UE. As mentioned above, the subscriber requirements may indicate the QoS pre-provisioned for this specific subscriber operating the UE, the priority level assigned to the subscription, the type of the application currently being run on the UE by the subscriber (e.g., applications like video streaming, real-time conferencing, FTP data transfer, which may require higher QoS provisioning), etc. Thus, for example, if the requesting UE is executing a high QoS application or is eligible for additional bandwidth or higher data rate on the primary RAT (than that available on the secondary RAT), the secondary RAN may grant the UE's request to switch to the primary RAT. If the request is granted, the secondary RAN may send a redirection message (over the secondary RAT) to the UE informing the UE that it is allowed to switch to the primary RAT.

In one embodiment, the present disclosure is directed to a method for providing inter-RAT load-balancing and congestion control when a wireless device attempts to reselect a primary RAT while receiving wireless communication over a secondary RAT that is different from the primary RAT. The method comprises performing the following steps using a network entity in a RAN that supports the secondary RAT: (i) broadcasting a message to all idle wireless devices receiving wireless communication over the secondary RAT, wherein the message contains a control function that enables each idle wireless device to activate an inter-RAT load-balancing functionality that controls reselection of the primary RAT; (ii) providing a common probability threshold value in the broadcast message for all idle wireless devices receiving wireless communication over the secondary RAT, regardless of whether the idle wireless devices are divided into different groups; (iii) through the control function, remotely configuring each idle wireless device camped on the secondary RAT to activate the inter-RAT load-balancing functionality; and (iv) allowing only those idle wireless devices to reselect the primary RAT that generate, in response to the activation of the inter-RAT load-balancing functionality, an individual device-specific random value that is equal to or greater than the common probability threshold value.

In another embodiment, the present disclosure is directed to a method for providing inter-RAT load-balancing and congestion control when a wireless device attempts to re-select a primary RAT while receiving wireless communication over a secondary RAT that is different from the primary RAT. The method comprises performing the following steps using a network entity in a RAN that supports the secondary RAT: (i) broadcasting a message to all idle wireless devices receiving wireless communication over the secondary RAT, wherein the message contains a control function that enables each idle wireless device to activate an inter-RAT load-balancing functionality that controls reselection of the primary RAT; (ii) providing a group identifier in the broadcast message to identify one or more pre-provisioned groups of idle wireless devices; (iii) providing one or more group-specific probability threshold values in the broadcast message; (iv) through the combination of the control function and the group identifier, remotely configuring each idle wireless device from only the identified groups of idle wireless devices to activate the inter-RAT load-balancing functionality, thereby enabling only the identified groups of idle wireless devices to re-select the primary RAT; and (v) from among the enabled idle wireless devices, allowing only those idle wireless devices to re-select the primary RAT that generate, in response to the activation of the inter-RAT load balance functionality, an individual device-specific random value that is equal to or greater than a respective group-specific probability threshold value associated with an identified group to which the enabled idle wireless device belongs.

In a further embodiment, the present disclosure is directed to a method for providing inter-RAT load-balancing and congestion control when a wireless device attempts to attach to a primary RAT while receiving wireless communication over a secondary RAT that is different from the primary RAT. The method comprises performing the following steps using a network entity in a RAN that supports the secondary RAT: (i) broadcasting a congestion indicator via a broadcast message to all wireless devices receiving wireless communication over the secondary RAT, wherein the wireless devices include: (a) a set of idle wireless devices, wherein each idle wireless device has no traffic channel established over the secondary RAT, and (b) a set of active wireless devices, each active wireless device has a traffic channel established over the secondary RAT; and (ii) through the congestion indicator, disabling a primary RAT re-selection functionality in each idle wireless device receiving the broadcast message, thereby preventing re-selection of the primary RAT by the idle wireless devices camped on the secondary RAT.

In another embodiment, the present disclosure is directed to a wireless device that is capable of wireless communication over a primary RAT and a secondary RAT that is different from the primary RAT. The wireless device comprises: (i) a transceiver configured to receive a broadcast message from a network entity in a RAN supporting the secondary RAT, wherein the broadcast message contains a congestion indicator that indicates that the primary RAT is congested; and (ii) a processor coupled to the transceiver and configured to perform the following: (a) process the congestion indicator, and (b) as a result of processing the congestion indicator, disable a primary RAT re-selection functionality in the wireless device when the wireless device is in an idle state with no traffic channel established on the secondary RAT.

In a still further embodiment, the present disclosure is directed to a wireless device that is capable of wireless communication over a primary RAT and a secondary RAT that is different from the primary RAT. The wireless device is in an idle state when receiving wireless communication over the secondary RAT. The wireless device comprises: (i) a transceiver configured to receive a broadcast message from a network entity in a RAN supporting the secondary RAT, wherein the broadcast message contains the following: (a) a control function, (b) a probability threshold value, and (c) a retention timer; and (ii) a processor coupled to the transceiver and configured to perform the following: (a) process the control function to activate an inter-RAT load-balancing functionality that controls re-selection of the primary RAT by the wireless device, (b) generate a random value in response to the activation of the inter-RAT load balancing functionality, (c) compare the generated random value with the received probability threshold value, (d) perform re-selection of the primary RAT when the generated random value is equal to or greater than the received probability threshold value, and (e) when the generated random value is less than the received probability threshold value, prevent re-activation of the inter-RAT load-balancing functionality until the retention timer expires.

In another embodiment, the present disclosure is directed to a mobile communication node configured to provide a radio interface to a wireless device that is capable of wireless communication over a primary RAT and a secondary RAT. The secondary RAT is different from the primary RAT, and the mobile communication node is part of a RAN that supports the secondary RAT. The mobile communication node comprises: (i) a processor configured to generate a broadcast message containing one of the following: (a) a congestion indicator that indicates that the primary RAT is congested, and wherein the congestion indicator, when processed by the wireless device, causes the wireless device to disable re-selection of the primary RAT when the wireless device is in an idle state, and (b) a set of non-congestion parameters that includes the following: (1) a control function that, when processed by the wireless device, enables the wireless device to activate an inter-RAT load-balancing functionality that controls re-selection of the primary RAT when the wireless device is in the idle state, and (2) a probability threshold value, wherein, upon activation, the inter-RAT load-balancing functionality causes the wireless device to generate a random value, compare the generated random value with the probability threshold value, and send a request to the mobile communication node to allow the wireless device to re-select the primary RAT when the generated random value is less than the probability threshold value; and (ii) a transceiver coupled to the processor and configured to perform the following: (a) transmit the broadcast message to the wireless device, (b) receive the request from the wireless device to allow the wireless device to re-select the primary RAT, and (c) send the received request to the processor, wherein the processor is configured to process the request from the wireless device and allow the wireless device to re-select the primary RAT.

Thus, certain embodiments of the present disclosure provide a number of sub-functions that may be included in a broadcast message from a secondary RAN to accomplish the desired inter-RAT load balancing and congestion control when wireless devices operating over a secondary RAT attempt to idle re-select to a primary RAT or request switching to the primary RAT.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of interworking between a 3GPP (e.g., LTE) and a 3GPP2 (e.g., EV-DO) cellular telephone/data networks, but it can be implemented in other forms of cellular or non-cellular wireless networks as well.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term (e.g., "pre-defined," "device-specific," "load-balancing", etc.) may be occasionally interchangeably used with its non-hyphenated version (e.g., "predefined," "device specific," "load balancing," etc.), and a capitalized entry (e.g., "Uplink," "Downlink," Radio Resource Management", etc.) may be interchangeably used with its non-capitalized version (e.g., "uplink," "downlink," "radio resource management", etc.). Such occasional interchangeable uses shall not be considered inconsistent with each other.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing voice information or non-voice data/control information) to/from the second entity regardless of the type (analog or digital) of those signals. It is further noted that various figures (including component diagrams) shown and discussed herein are for illustrative purpose only, and are not drawn to scale.

Figure 1:
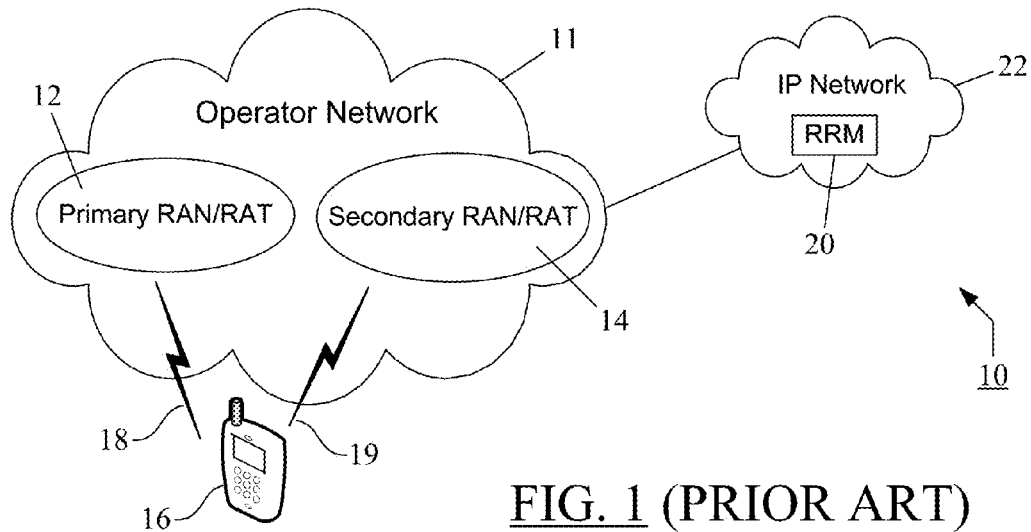
FIG. 1 illustrates an exemplary network configuration showing a heterogeneous wireless network containing two different RANs wherein each RAN supports a corresponding different RAT.
Figure 2:
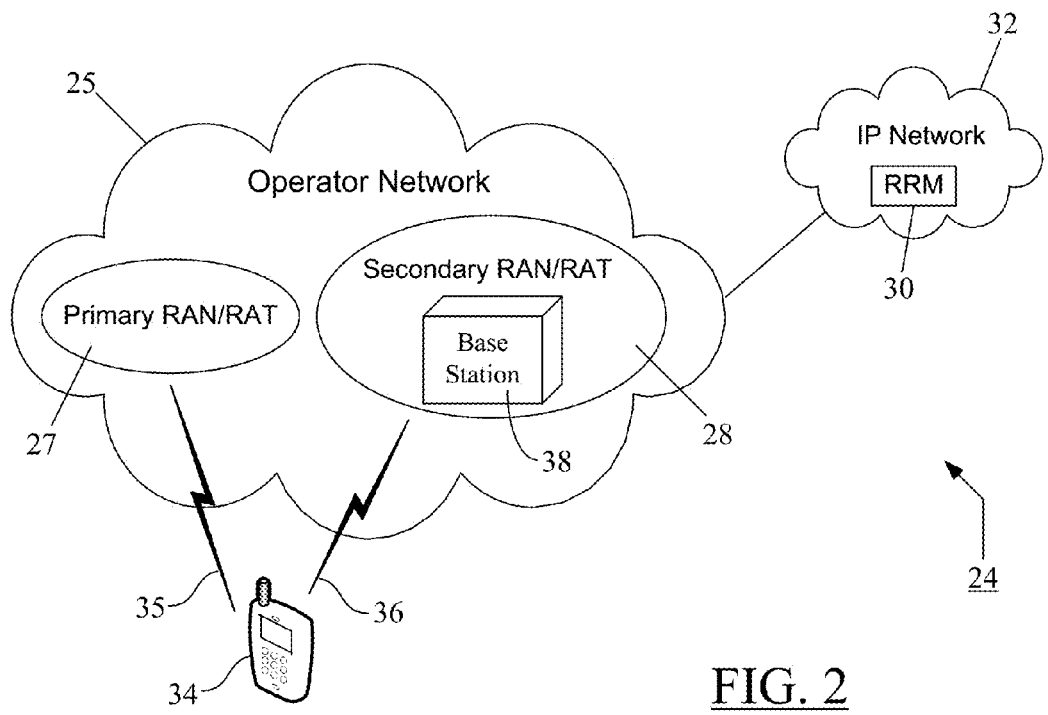
FIG. 2 is a diagram of an exemplary wireless system in which the inter-RAT load-balancing and congestion control methodology according to the teachings of one embodiment of the present disclosure may be implemented.

FIG. 2 is a diagram of an exemplary wireless system 24 in which the inter-RAT load-balancing and congestion control methodology according to the teachings of one embodiment of the present disclosure may be implemented. Like the network configuration 10 in FIG. 1, the wireless system 24 includes a heterogeneous wireless network 25 containing two different RANs—a primary RAN 27 and a secondary RAN 28, wherein each RAN supports a corresponding different RAT. As noted before, the "primary" and "secondary" designations are used herein simply for the ease of discussion of inter-RAT load balancing. The "primary" and "secondary" designations do not imply that secondary RAN/RAT is somehow inferior to or less preferred than the primary RAN/RAT. The network 25 may be a cellular telephone network operated, managed, owned, or leased by a wireless/cellular service provider (or operator). The network 25 also may be coupled to a centralized RRM unit 30 via an IP network (e.g., the Internet) 32. The RRM unit 30 and the IP network 32 may be functionally similar to corresponding entities 20 and 22 shown in FIG. 1. Because of substantial similarities between network configurations in FIGS. 1 and 2 and because of earlier discussion of FIG. 1, any discussion of the common features or characteristics of network entities having similar functionalities in FIGS. 1 and 2 is not repeated herein for the sake of brevity. Hence, in the discussion below, only the distinctive and salient aspects of the wireless system 24 are provided. However, it is noted that relevant discussion from FIG. 1 (e.g., discussion related to an RRM unit, discussion of a core network, distinction between a RAN and a RAT, types of RANs/RATs, etc.) continues to apply to similar entities in FIG. 2, except where noted. Like the wireless device 16 in FIG. 1, a wireless device 34 is shown to be in wireless communication with the primary RAN 27 (that supports a corresponding "primary RAT") and the secondary RAN 28 (that supports a corresponding "secondary RAT") via exemplary wireless links 35-36, respectively. As mentioned before, a wireless device may communicate with a RAN using an appropriate device-selected RAT.

The wireless device 34 in FIG. 2 is similar to the wireless device 16 in FIG. 1, except that the wireless device 34 has additional capabilities to perform its portion of inter-RAT load-balancing as per the teachings of the embodiments shown in FIGS. 3-7 (discussed later below). Like the wireless device 16 in FIG. 1, the wireless device 34 in FIG. 2 also may be a UE, or an MS, or an AT (or evolved AT). Generally, the wireless device 34 (also referred to by various analogous terms such as "mobile handset," "wireless handset," "terminal," etc.) may be any multi-mode mobile handset enabled (e.g., by the device manufacturer or the network operator) for communications over the primary and the secondary RATs. Because examples of different types of "wireless devices" are already provided earlier under the "Background" section, such examples are not repeated herein for the sake or brevity. As noted earlier, for the sake of simplicity, in the discussion herein, the term "UE" may be primarily used as representative of all such wireless devices (i.e., AT's, MS's, or other mobile terminals), regardless of the type (i.e., whether a 3GPP system, a 3GPP2 system, etc.) of the primary and secondary RANs/RATs.

Thus, although the wireless device 34 in FIG. 2 may be generally functionally similar to the wireless device 16 in FIG. 1, it can be distinguished from the wireless device 16 in the sense that wireless device 34 in FIG. 2 is capable of supporting the inter-RAT load-balancing and congestion control methodology according to particular embodiments of the present disclosure, whereas the existing device 16 may not provide such support without suitable modifications according to the teachings of the present disclosure. Specific details or functionalities of the device 34 that may be needed to support the methodology of the present disclosure are discussed at length below.

It is noted here that the teachings of the present disclosure may also apply to non-mobile wireless devices or terminals such as, for example, primarily stationary M2M communication devices (e.g., remote sensors or stationary transceivers).

In the embodiment of FIG. 2, the wireless device 34 is shown to be in communication with the secondary RAN 28 through a base station (also interchangeably referred to herein as a "network entity," "mobile communication node," or simply a "node") 38 of the secondary RAN 28. The base station 38 may provide the radio interface (e.g., a Radio Frequency (RF) channel) necessary to support the wireless device's communication over the secondary RAT. There may be a similar base station in the primary RAN 27 as well. However, the present disclosure—as explained below through FIGS. 3-7—primarily relates to the acts performed by a network entity (i.e., the base station 38 in FIG. 2) in the secondary RAN 28. Because of lack of relevance of a primary RAN-based network entity to the discussion of the teachings of the present disclosure, only the secondary RAN-based network entity 38 is shown in FIG. 2 and discussed below. It is observed here that when the secondary RAN is an LTE E-UTRAN, the base station 38 may be an evolved Node-B (eNodeB or eNB) or Home eNodeB (HeNB). On the other hand, when the secondary RAN is an EV-DO based evolved Access Network (eAN), the base station 38 may be an evolved Base Transceiver Station (eBTS).

In the discussion below (especially with reference to FIGS. 6-7) it is assumed that the primary RAN/RAT 27 is an LTE E-UTRAN, whereas its corresponding secondary RAN/RAT 28 is an EV-DO based eAN. As noted before, other combinations of primary and secondary RANs/RATs may be envisaged, and the teachings of the present disclosure may be equally applied to such different combinations.

In other embodiments, the base station 38 may also include a site controller, an access point (AP), a radio tower, or any other type of radio interface device capable of operating in a wireless environment. In one embodiment, the base station 38 may be configured to implement an intra-cell or inter-cell Coordinated Multi-Point (CoMP) transmission/reception arrangement. In addition to providing air interface or wireless channel (e.g., as represented by wireless link 36 in FIG. 2) to the device 34, the communication node (or base station) 38 may also perform radio resource management (as, for example, in case of an eNodeB or HeNB in an LTE system) using, for example, the channel feedback reports received from the wireless device 34 operating in the network 25.

In case of a 3G carrier network 25, the network entity 38 may include functionalities of a 3G base station along with some or all functionalities of a 3G Radio Network Controller (RNC). Various base stations—whether 3G base stations or base stations in other types of carrier networks (e.g., Fourth Generation (4G) networks and beyond)—may be configured as discussed below to implement the inter-RAT load-balancing and congestion control solution according to particular embodiments of the present disclosure. For example, in one embodiment, the base station 38 may be configured (in hardware, via software, or both) to implement the inter-RAT load-balancing and congestion control methodology as discussed herein. For example, when existing hardware architecture of the base station 38 cannot be modified, the inter-RAT load-balancing methodology according to one embodiment of the present disclosure may be implemented through suitable programming of one or more processors (e.g., the processor 185 (or, more particularly, the processing unit 193) and the scheduler 197 in FIG. 9) in the network entity 38. The execution of the program code (by a processor in the node 38) may cause the processor to perform appropriate method steps—e.g., generate a broadcast message or broadcast a congestion indicator to all wireless devices receiving wireless communication over the secondary RAT 28—which are illustrated in FIGS. 3 and 5-7 (discussed later below). Thus, in the discussion below, although the base station 38 may be referred to as "performing," "accomplishing," or "carrying out" a function or process, such performance may be technically accomplished in hardware and/or software as desired. Similarly, the wireless device 34 may be suitably configured (in hardware and/or software) to receive, process, and appropriately respond to broadcast messages received from the base station 38 as discussed below.

In the discussion herein, the terms "wireless network," "mobile communication network," "operator network," or "carrier network" may be used interchangeably to refer to a wireless communication network (e.g., a cellular network, a proprietary data communication network, a corporate-wide wireless network, etc.) facilitating voice and/or data communication with wireless devices (like the device 34). The wireless network 25 may be a dense network with a large number of wireless terminals (e.g., a large number of UEs) operating therein. It is understood that there may be stationary (e.g., M2M devices) as well as mobile devices (e.g., mobile handsets/terminals) operating in the network 25.

The carrier network 25 may include a network controller (not shown) coupled to the base stations in its RANs and providing logical and control functions (e.g., terminal mobility management, access to external networks or communication entities, subscriber account management, etc.) in the network 25. In one embodiment, the network controller may be a Core Network (CN) that is commonly shared by the network entities in the primary and the secondary RANs (e.g., as in case of LTE-eHRPD interworking). Regardless of the type of the carrier network 25, the network controller may function to provide connection of the base station 38 to other terminals (not shown) operating in the radio coverage of the secondary RAN 28, and also to other communication devices (e.g., wireline or wireless phones, computers, monitoring units, etc.) or resources (e.g., an Internet website) in other voice and/or data networks (not shown) external to the carrier network 25. In that regard, the network controller may be coupled to a packet-switched network (e.g., an Internet Protocol (IP) network 32, such as the Internet) as well as a circuit-switched network (not shown), such as the Public-Switched Telephone Network (PSTN), to accomplish the desired connections beyond the carrier network 25.

The operator network 25 may be a cellular telephone network, a Public Land Mobile Network (PLMN), or a non-cellular wireless network (whether voice network, data network, or both). The wireless device 34 may be a subscriber unit in the operator network 25. Furthermore, portions of the operator network 25 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 25 may be connected to the Internet via its network controller's connection to the IP network 32 or may include a portion of the Internet as part thereof. In one embodiment, the operator network 25 may include more or less or different type of functional entities than those shown in FIG. 2.

Although various examples in the discussion below are provided primarily in the context of the primary and secondary RANs being IP-based 3GPP (e.g., E-UTRAN) and 3GPP2 (e.g., eAN) RANs, respectively, the teachings of the present disclosure may equally apply, with suitable modifications, to a number of different Frequency Division Multiplex (FDM) and Time Division Multiplex (TDM) based cellular wireless systems or networks (as well as Frequency Division Duplex (FDD) and Time Division Duplex (TDD) wireless systems/networks) where radio resources are "scheduled" to a wireless terminal by a network-based entity. Such cellular networks or systems may include, for example, standard-based systems/networks using Second Generation (2G), 3G, or Fourth Generation (4G) specifications, or non-standard based systems. Some examples of such systems or networks include, but not limited to, GSM networks, GPRS networks, Telecommunications Industry Association/Electronic Industries Alliance (TIA/EIA) Interim Standard-136 (IS-136) based Time Division Multiple Access (TDMA) systems, WCDMA systems, WCDMA-based HSPA systems, 3GPP2's CDMA based High Rate Packet Data (HRPD) or evolved HRPD (eHRPD) systems, CDMA2000 or TIA/EIA IS-2000 systems, Evolution-Data Optimized (EV-DO) systems, WiMAX systems, International Mobile Telecommunications-Advanced (IMT-Advanced) systems (e.g., LTE Advanced systems), other Universal Terrestrial Radio Access Network (UTRAN) or Evolved UTRAN (E-UTRAN) networks, GSM/EDGE systems, Fixed Access Forum or other IP-based access networks, a non-standard based proprietary corporate wireless network, etc. It is noted that the teachings of the present disclosure are also applicable to FDM variants such as, for example, Filter Bank Modulation option, as well as to multiple access schemes based on spatial division (e.g., Spatial Division Multiple Access (SDMA)).

Figure 3A:
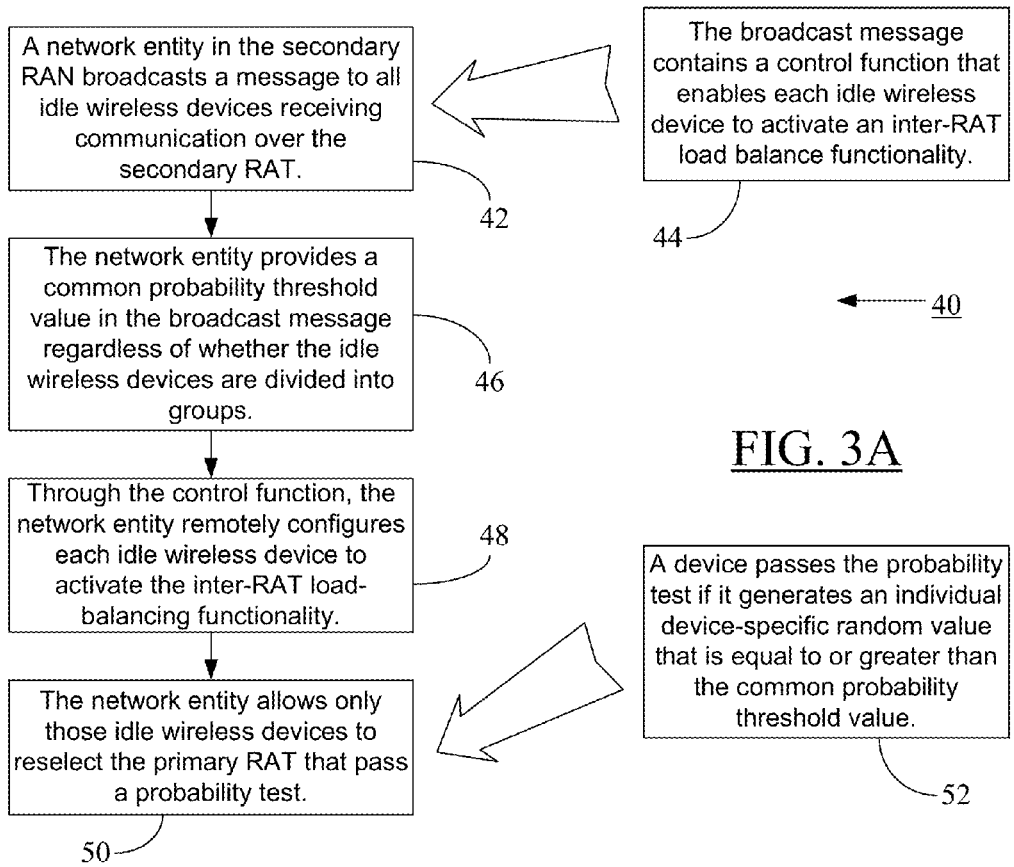
FIGS. 3A-3C depict exemplary flowcharts showing various steps that may be performed by a network entity in a secondary RAN according to the teachings of particular embodiments of the present disclosure.
Figure 3C:
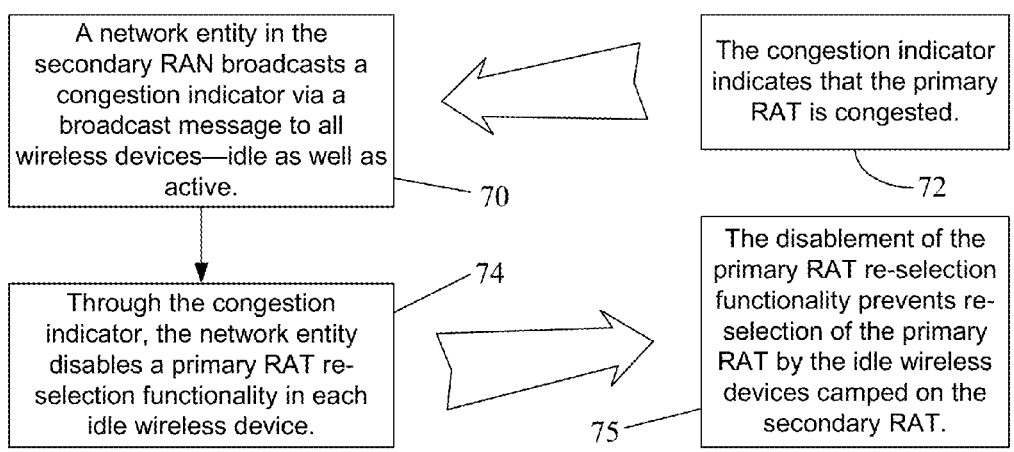
Figure 3B:
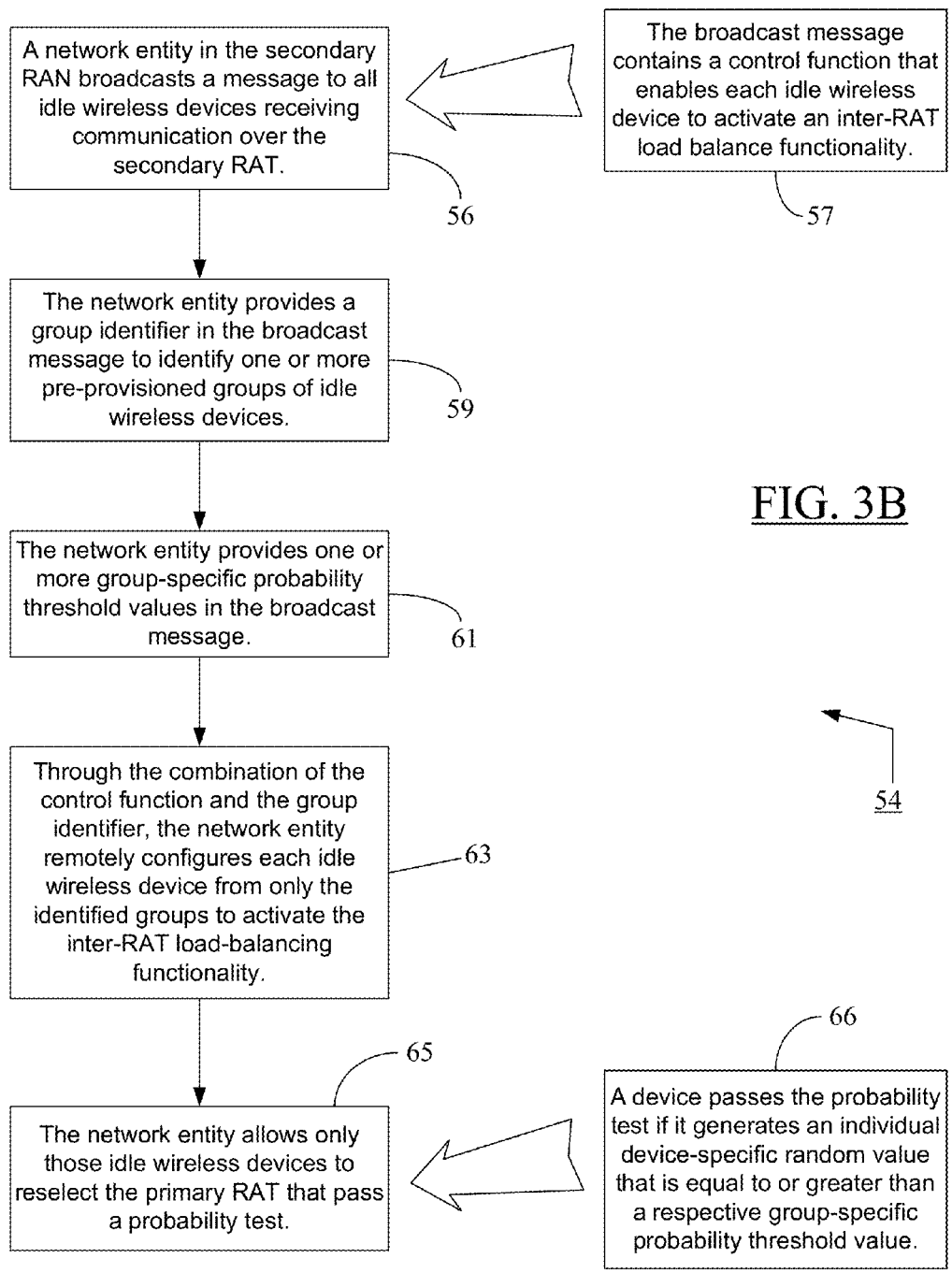

FIGS. 3A-3C depict exemplary flowcharts 40, 54, 68, respectively, showing various steps that may be performed by a network entity (e.g., the base station 38) in a secondary RAN (e.g., the secondary RAN 28) according to the teachings of particular embodiments of the present disclosure. FIGS. 3A-3C illustrate general details of various inter-RAT load-balancing methodologies according to the teachings of the present disclosure. A more detailed discussion of these methodologies is provided later below with reference to FIGS. 5-7.

The flowcharts 40, 54, and 68 in FIGS. 3A-3C, respectively, relate to different methods for providing inter-RAT load-balancing and congestion control when a wireless device (e.g., the UE 34) attempts to reselect a primary RAT while receiving wireless communication over a secondary RAT that is different from the primary RAT. These flowcharts depict method steps that may be performed using the network entity 38 in the secondary RAN 28 (which supports the secondary RAT). In case of the flowchart 40 in FIG. 3A, the network entity 38 may initially broadcast a message to all idle wireless devices receiving communication over the secondary RAT (block 42). The broadcast message may contain a control function that enables each idle wireless device to activate an inter-RAT load-balancing functionality that controls the device's reselection of the primary RAT (block 44). As indicated at block 46 in FIG. 3A, the network entity 38 may also provide a common probability threshold value in the broadcast message for all idle wireless devices receiving wireless communication over the secondary RAT, regardless of whether the idle wireless devices are divided into different groups. Hence, the probability threshold value is group-agnostic—i.e., it applies to all idle wireless devices whether or not they are pre-provisioned into groups. Through the control function in the broadcast message, the network entity 38 may then remotely configure each idle wireless device camped on the secondary RAT to activate the inter-RAT load-balancing functionality (block 48). In response to the activation of the inter-RAT load-balancing functionality, each idle wireless device may generate an individual device-specific random value. The network entity may allow only those idle wireless devices to reselect the primary RAT that pass a probability test (block 50). As noted at block 52, a device passes the probability test if it generates an individual device-specific random value that is equal to or greater than the common probability threshold value (received in the broadcast message from the network entity).

FIG. 3B illustrates a flowchart 54 in which grouping of wireless devices is taken into account and the network entity 38 provides group-specific probability values in the broadcast message. Blocks 56 and 57 in FIG. 3B are identical to blocks 42, 44, respectively, in FIG. 3A and, hence, their discussion is not repeated herein. As indicated at block 59, the network entity 38 may provide a group identifier in the broadcast message to identify one or more pre-provisioned groups of idle wireless devices. As mentioned earlier, UEs may be grouped, for example, using last digits of their IMSI numbers as group numbers. For example, the group identifier may identify three (3) (e.g., groups "0," "5," and "8") out of ten (10) pre-provisioned groups (i.e., groups "0" through "9"). The network entity 38 may also include one or more group-specific probability threshold values in the broadcast message (block 61). As an example, in case of the three groups mentioned here, groups "0" and "8" may be assigned a probability threshold of "0.6," whereas group "5" may be assigned a probability threshold of "0.75". Through the combination of the control function and the group identifier, the network entity 38 may remotely configure each idle wireless device—from only the identified groups of idle wireless devices—to activate the inter-RAT load-balancing functionality (block 63). As noted earlier, the activation of the inter-RAT load-balancing functionality enables a wireless device to perform the primary RAT re-selection. Thus, in the present example, only the idle wireless devices from groups "0", "5", and "8" will be enabled to perform the primary RAT re-selection. From among the enabled idle wireless devices (i.e., devices from groups "0", "5", and "8" in the example here), the network entity 38 may allow only those idle wireless devices to reselect the primary RAT that pass a probability test (block 65). As noted at block 66, a device is considered to have passed the probability test if it generates an individual device-specific random value that is equal to or greater than a respective group-specific probability threshold value associated with the identified group to which the device belongs. Thus, for example, any idle device from groups "0" and "8" is considered to have passed the probability test if that device locally generates a random value that is equal to or greater than "0.6"—the group-specific probability threshold value for each of the groups "0" and "8" in the example being discussed here.

FIG. 3C shows a flowchart 68 that addresses inter-RAT congestion control. When a wireless device (e.g., the UE 34) attempts to attach to a primary RAT (e.g., the primary RAT 27) while receiving wireless communication over a secondary RAT (e.g., the secondary RAT 28), a network entity (e.g., the base station 38) in the secondary RAN 28 may broadcast a congestion indicator to all wireless devices receiving wireless communication over the secondary RAT (block 70). The congestion indicator may be sent via a broadcast message to all wireless devices—idle devices (i.e., devices without any traffic channel established over the secondary RAT) as well as active devices (i.e., devices that have corresponding traffic channels established over the secondary RAT). As shown at block 72, the congestion indicator may indicate that the primary RAT is congested. Through the congestion indicator, the network entity 38 may disable the primary RAT re-selection functionality in each idle wireless device receiving the broadcast message (block 74). As noted at block 75, the disablement of the primary RAT re-selection functionality prevents re-selection of the (already-congested) primary RAT 27 by the idle wireless devices camped on the secondary RAT 28.

Figure 4:
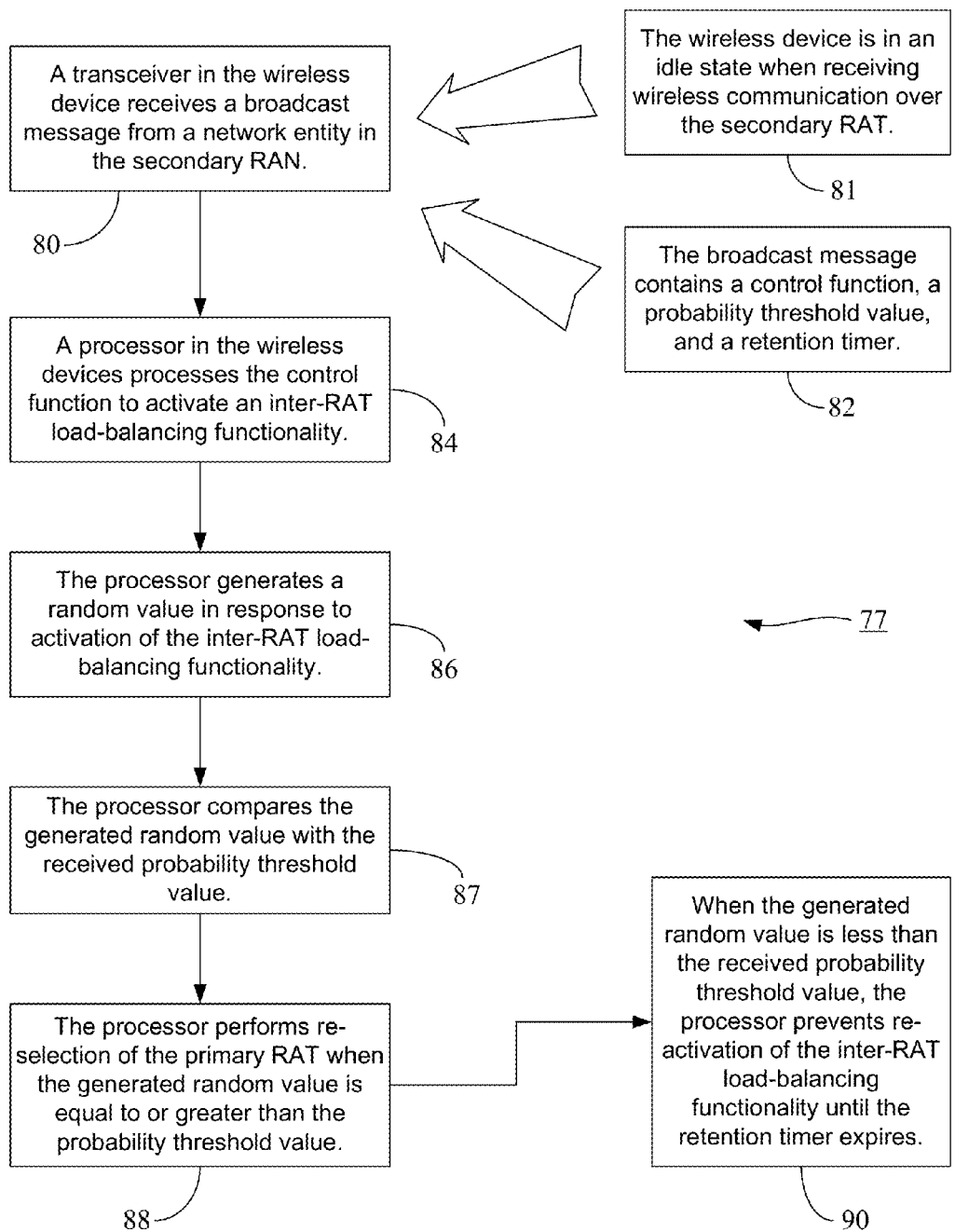
FIG. 4 shows an exemplary flowchart depicting various steps that may be performed by a wireless device in response to receiving a broadcast message from a network entity in the secondary RAN.

FIG. 4 shows an exemplary flowchart 77 depicting various steps that may be performed by a wireless device (e.g., the UE 34) in response to receiving a broadcast message from a network entity (e.g., the base station 38) in the secondary RAN 28. At block 80, a transceiver in the wireless device (e.g., the transceiver 179 in FIG. 8) may receive the broadcast message from the network entity. As mentioned later with reference to discussion of FIG. 8, the transceiver 179 may be a single entity or may comprise of two separate units—a transmitter and a receiver. As noted at block 81, the wireless device may be in an idle state when receiving wireless communication over the secondary RAT. Furthermore, as noted at block 82, the broadcast message may contain a control function, a probability threshold value, and a retention timer. The wireless device may contain a processor (e.g., the processor 175 in FIG. 8) that is coupled to the transceiver. In the embodiment of FIG. 4, the processor in the wireless device may process the control function to activate an inter-RAT load-balancing functionality that controls re-selection of the primary RAT by the wireless device (block 84). The processor may then generate a random value in response to the activation of the inter-RAT load-balancing functionality (block 86). Thereafter, the processor may compare the generated random value with the received probability threshold value (block 87). Based on the comparison, the processor may perform re-selection of the primary RAT when the generated random value is equal to or greater than the probability threshold value (block 88). However, when the generated random value is less than the received probability threshold value, the processor may prevent re-activation of the inter-RAT load-balancing functionality until the retention timer expires (block 90).

From the discussion of FIGS. 3A-3C and 4, it is observed that particular embodiments of the present disclosure provide for a new broadcast message (from a network entity in the secondary RAN) that may include one or more of the following fields listed below. The broadcast message may be sent to all UEs receiving wireless communication over the secondary RAT—i.e., all UEs operating in the secondary RAN (whether in the active state or the idle state). It is noted here that, instead of using a new broadcast message, these fields can also be included in an existing broadcast message (such as, for example, the OtherRATNeighborList message mentioned below). One or more of the following fields may be selected for inclusion in a broadcast message:

(1) A Probability Threshold Included (e.g., P_threshold_INCL) field with a Probability Threshold Value field: The "Probability Threshold Included" field may indicate to a UE that a common probability threshold field is present in the broadcast message. The "Probability Threshold Value" field may then specify the common probability threshold value applicable to all UEs regardless of their grouping. Thus, if these fields are included in the broadcast message, all idle UEs in all groups use this threshold value to perform the random test procedure (i.e., the probability test procedure) mentioned before (and also discussed later below). All idle UEs in all groups that pass the random test procedure may be allowed (by the network entity in the secondary RAN) to re-select the primary RAT.

(2) Retention Timer Included and Retention Timer fields: The "Retention Timer Included" field may indicate to a UE that a retention timer is present in the broadcast message. The "Retention Timer" field may then specify the duration/period of such retention timer. If these timer-related fields are included in the broadcast message, all idle UEs that fail the random test procedure may not be allowed (by the network entity 38 in the secondary RAN) to perform another random test (in an attempt to re-select the primary RAT) during the retention timer period.

(3) Group_Included_Indicator field along with a Group Bitmap: The "Group_Included_Indicator" field may signify to a UE that group-specific treatment is contemplated in the broadcast message. The Group Bitmap may be a pre-defined binary sequence (e.g., of ten binary bits, each bit corresponding to one of the groups "0" through "9" mentioned earlier) that can identify which groups are enabled for idle reselection. Each UE receiving the Group Bitmap may be configured to "decode" this binary sequence to determine whether that UE's group is one of those enabled. In one embodiment, the group (of UEs) that is enabled for idle re-selection to the primary RAT has its corresponding bit set to "1". If the Group Bitmap is not used, but the Group_Included_Indicator is set to "1", then the broadcast message may include the actual group numbers (e.g., "0", "5", "8" for group numbers "0", "5", and "8") that are enabled. If the group information is included in the broadcast message, then the message can optionally include either one common Probability Threshold Value (applicable to UEs in all enabled groups) or group-specific probability threshold values (i.e., one Probability Threshold Value for each enabled group). The random test procedure (i.e., generation of a random value and comparison of the random value with the applicable probability threshold value) may be then performed by each idle UE from the enabled groups to determine whether that UE can reselect the primary RAT. If the Retention Timer field (mentioned above) is also included in the broadcast message, then the Retention Timer requirement applies as discussed before.

It is observed here that the group-specific probability values according to one embodiment of the present disclosure are different from the carrier-specific probability values discussed in the "Background" section in the context of one of the two solutions to the RAT congestion issue.

(4) Congestion Indicator field: In one embodiment, when the primary RAT is congested, the Congestion Indicator field may be placed before all of the above-mentioned fields in the broadcast message (as shown, for example, in FIG. 5). Alternatively, the broadcast message may only contain the Congestion Indicator field. If the Congestion Indicator field is included, none of the UEs (operating under the secondary RAT and receiving the broadcast message) is allowed to idle re-select to the primary RAT. However, in one embodiment, based on the provisioning/configuration of a UE, the UE may still send (to the network entity 38) an individual request for idle reselection to the primary RAT, despite the presence of the Congestion Indicator field in the broadcast message. The network entity 38 in the secondary RAN may then determine whether it should grant the UE's request or not. Thus, exceptions may be granted by the network entity 38 on a case-by-case basis even if the Congestion Indicator indicates that the primary RAT is congested. Some exemplary events that may warrant granting such exception include a UE's execution of certain applications that require higher QoS or more bandwidth (e.g., video streaming, FTP file transfers, real-time conferencing, etc.) than that supported over the secondary RAT, or a UE's execution of applications that are only supported through the primary RAT, etc.

It is observed here that, based on certain determination on the secondary RAT, the network entity 38 in the secondary RAN 28 may decide to send the above-mentioned broadcast message to perform load-balancing between the primary and the secondary RATs or to perform congestion control. Such determination may be based on information received by the secondary RAN as a result of network-based sharing of load information for primary and secondary RATs and/or information received from UE-assisted sharing of information about the neighboring RAT (i.e., the primary RAT) such as, for example, the neighbor (i.e., the primary RAT) Received Signal Strength Indicator (RSSI) signal.

Figure 5:
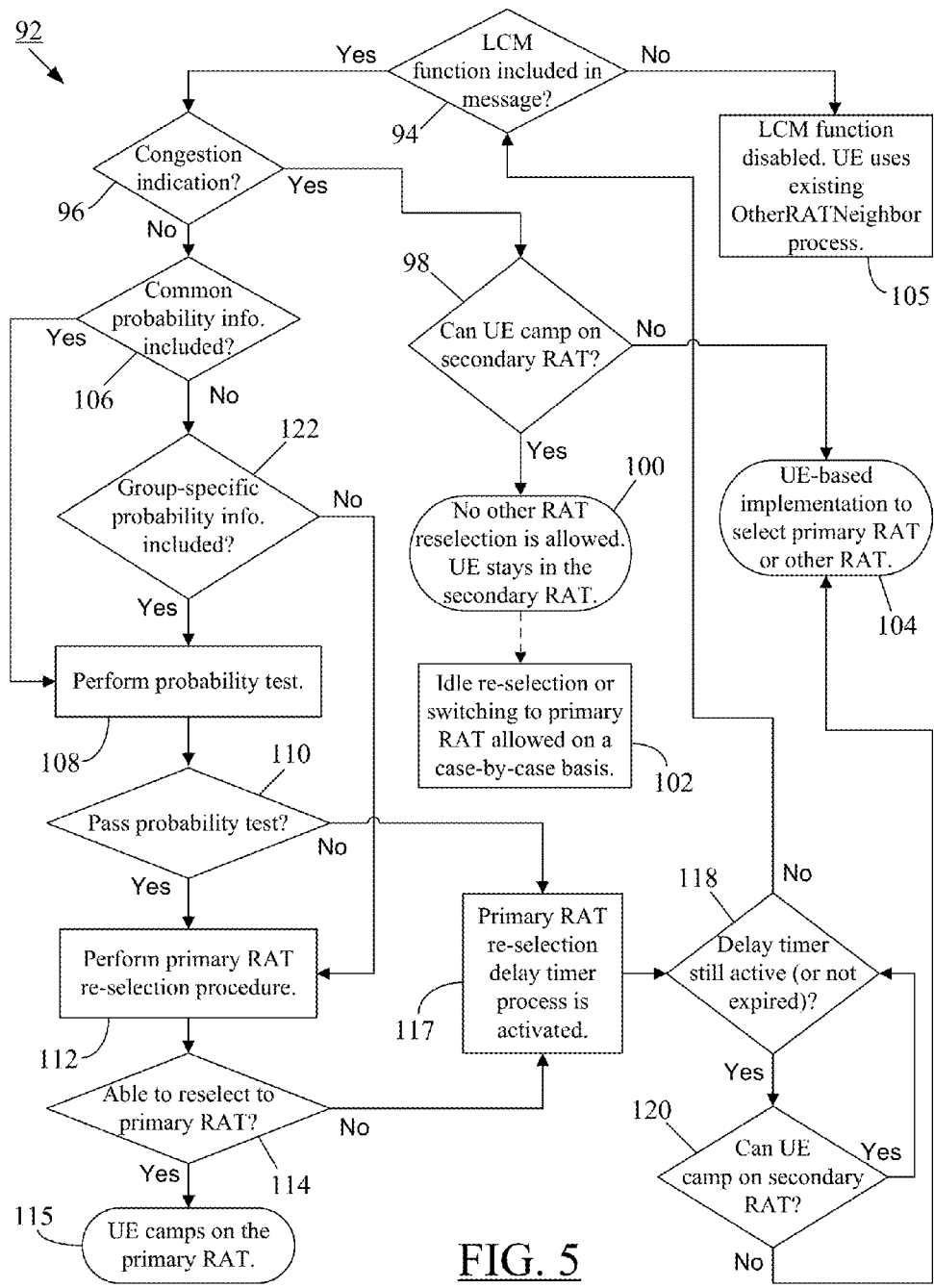
FIG. 5 is an exemplary flowchart showing details of how inter-RAT load-balancing and congestion control may be implemented according to particular embodiments of the present disclosure.

FIG. 5 is an exemplary flowchart 92 showing details of how inter-RAT load-balancing and congestion control may be implemented according to particular embodiments of the present disclosure. Three different exemplary embodiments are discussed with reference to FIG. 5. The first embodiment addresses congestion control (blocks 94, 96, 98, 100, 102, and 104-105 in FIG. 5), the second embodiment relates to inter-RAT load balance without group function (blocks 94, 96, 106, 108, 110, 112, 114-115, 117-118, 120, and 104-105 in FIG. 5), and the third embodiment relates to inter-RAT load balance with group function (blocks 94, 96, 106, 122, 108, 110, 112, 114-115, 117-118, 120, and 104-105 in FIG. 5).

In the discussion below (especially with reference to FIGS. 6-7), it is assumed that the primary RAN/RAT 27 is an LTE E-UTRAN, whereas its corresponding secondary RAN/RAT 28 is an EV-DO based eAN. As noted before, other combinations of primary and secondary RANs/RATs may be possible and teachings of the present disclosure equally apply to such combinations. Furthermore, it is noted here that when the secondary RAT is HRPD, then a BTS (in an eAN) may be configured to send the broadcast message. On the other hand, when the secondary RAT is part of an LTE system, then an eNB may be configured to send the over-the-air broadcast message. Similar network entities in other combinations of primary and secondary RANs/RATs may be configured to send respective broadcast messages.

First Embodiment: Congestion Control (1) Based on certain conditions (e.g., network-based sharing of load information and/or UE-assisted sharing through RSSI signal, as mentioned earlier), the network entity 38 in the secondary RAN 28 may decide to broadcast a message with a Load Control Message (LCM) function to all UEs (active and idle) receiving wireless communication over the secondary RAT. As noted earlier, the broadcast message may be an existing broadcast message or a newly-defined broadcast message. If the LCM function is included in the broadcast message at decision block 94, the LCM function may include a congestion indicator (block 96). The congestion indicator may indicate that the primary RAT is congested and may perform congestion control for the primary RAT. The congestion indicator may be provided as a "Primary_RAT_Congested" field in the LCM function. In the LCM, the secondary RAN 28 may set the Primary_RAT_Congested field to "1" to inform the UEs that the primary RAT is congested.

(2) All idle UEs in the secondary RAT receive the broadcast message with the LCM function, and disable any supported primary RAT reselection function (blocks 98, 100 in FIG. 5). All idle UEs remain in the secondary RAT unless a UE cannot acquire the secondary RAT system (i.e., cannot camp on the secondary RAT), in which case the UE may initiate a UE-based implementation (e.g., as pre-programmed or pre-provisioned by the network operator or UE manufacturer) to select primary RAT or other RAT (blocks 98 and 104 in FIG. 5).

(3) As mentioned earlier and as shown at block 102 in FIG. 5, the secondary RAN 28 may still optionally allow idle re-selection (by a UE in an idle state) or switching (by a UE in an active state) to the primary RAT on a case-by-case basis even if the congestion indicator is set to "1." This optional arrangement is depicted by a broken arrow connecting blocks 100 and 102. Thus, in one embodiment, the network entity 38 in the secondary RAN 28 can activate network-controlled idle reselection or redirection to the primary RAT despite the presence of the congestion indicator field in the broadcast message.

(4) The UEs in the secondary RAT may consider the inter-RAT congestion control function to be de-activated if the LCM function is not broadcasted (block 105 in FIG. 5) or if the congestion indicator (i.e., the Primary_RAT_Congested field) is absent from the LCM function or set to "0". In the absence of the LCM function, the idle UEs may use the existing OtherRATNeighbor process to determine when to reselect to the primary RAT. Such existing process may relate to the OtherRATNeighborList message defined and discussed at length in section 5.5.6.2.4 of the 3GPP2 document C.S0087-A, version 2.0, titled "E-UTRAN-cdma 2000 HRPD Connectivity and Interworking Air Interface Specification", June 2012 (hereafter "3GPP2 Document").

Second Embodiment: Inter-RAT Load-Balancing without Group Function (1) As mentioned earlier, based on certain conditions, the network entity 38 in the secondary RAN 28 may decide to broadcast a message with the LCM function to all UEs (active and idle) receiving wireless communication over the secondary RAT. The LCM function may be included in the broadcast message to perform load balance and, hence, the earlier-discussed congestion indicator may be absent from the LCM function or may be set to the value "0" (blocks 94, 96 in FIG. 5). As noted earlier, the broadcast message may be an existing broadcast message or a newly-defined broadcast message. In the LCM function, the network entity 38 may include a common Probability_Threshold field (containing a probability threshold value applicable to all UEs regardless of their grouping) and a Retention Timer field (block 106 in FIG. 5).

(2) All idle UEs in the secondary RAT receive the broadcast message with the LCM function. In response, the UEs may activate an inter-RAT load balance function that controls reselection of the primary RAT. Thus, through the LCM function, the network entity 38 may "trigger" the idle UEs to activate the inter-RAT load-balancing functionality that will enable the idle UEs to attempt to re-select the primary RAT. Each (idle) UE that decides to reselect the primary RAT may generate a UE-specific random value and compare it with the received Probability_Threshold value (block 108). The LCM function may trigger each of these UEs (i.e., the UEs that decide to reselect the primary RAT) to generate a UE-specific random value in response to that UE's activation of the inter-RAT load-balancing functionality.

(3) The UEs whose locally-generated random values are greater than or equal to the received Probability_Threshold value are considered to have passed the probability test (also interchangeably referred to herein as the "random test"). The UEs that pass the probability test may continue with the primary RAT reselection process (blocks 110, 112). These UEs may use Multi-Mode System Selection (MMSS) or Inter-RAT Neighbor List mechanism (like the earlier-mentioned OtherRATNeighborList message from the 3GPP2 document) or other similar means (e.g., a Preferred Roaming List (PRL)) to continue the reselection process. An idle UE that is able to select and camp on the primary RAT may stop the procedure here (as indicated through the blocks 114 and 115 in FIG. 5). However, if a UE is not able to re-select the primary RAT, the UE may have to follow the retention timer requirements discussed below (and as shown at block 117 in FIG. 5).

(4) In one embodiment, an idle UE that does not pass the probability test (at block 110) will not be allowed to perform another primary RAT reselection. Such prevention may be accomplished via the retention timer (also referred to herein as "delay timer"). In one embodiment, the broadcast message may contain the retention timer as mentioned above.

The probability-test-failing UE may activate the retention timer (block 117), but may have to wait until the retention timer expires before that UE is allowed (by the network entity 38) to reselect the primary RAT again (block 118) through another iteration of the probability test-related steps—resulting from activation of the inter-RAT load-balancing procedure—using a new probability threshold transmitted via another broadcast message (blocks 94, 96, 106, 108, etc. in FIG. 5). Thus, in this embodiment, the broadcast message may contain a retention timer and a UE may store the retention timer in its memory (e.g., the memory 177 in FIG. 8). If the UE fails a reselection attempt, the LCM function may configure the UE such that the UE does not perform another inter-RAT load-balancing procedure (and, hence, another primary RAT re-selection attempt) until after the delay timer expires. Instead of such UE-based retention timer, in one embodiment, a network-based retention timer may be employed. In such an embodiment, the network (e.g., at the base station 38) may maintain the retention timer and the broadcast message may be without such a timer. The network entity 38 may activate the retention timer when the broadcast message is sent. The UEs that fail the random test may not perform another inter-RAT load-balancing procedure and may have to wait for another broadcast message from the network entity (containing a new probability threshold value) before attempting to reselect the primary RAT again. When the retention timer expires, the network entity 38 may send a new broadcast message with a new probability threshold value and with an indication to trigger a UE to perform primary RAT reselection again (with the assumption that the UE has already failed the first reselection attempt and was disallowed to perform another reselection until instructed otherwise from the network entity 38).

It is noted here that a UE may abandon the inter-RAT load-balancing procedure altogether if the UE is not able to camp on the secondary RAT (e.g., the secondary RAT system becomes unavailable, or pilot strength of secondary RAT becomes too weak to maintain a connection), as indicated at decision block 120 in FIG. 5.

(5) The UEs in the secondary RAT may consider the inter-RAT load-balancing function to be de-activated if the LCM function is not broadcasted or if none of the related fields (e.g., probability threshold value or retention timer (if applicable)) are included in the broadcasted LCM function (block 105 in FIG. 5). If the inter-RAT load-balancing function is considered to be de-activated, the idle UEs may use the existing OtherRATNeighbor process to determine when to reselect to the primary RAT. As noted earlier, such existing process is defined and discussed at length in the 3GPP2 Document.

Third Embodiment: Inter-RAT Load-Balancing with Group Function (1) As mentioned earlier, based on certain conditions, the network entity 38 in the secondary RAN 28 may decide to broadcast a message with the LCM function to all UEs (active and idle) receiving wireless communication over the secondary RAT. The LCM function may be included in the broadcast message to perform load balance and, hence, the earlier-discussed congestion indicator may be absent from the LCM function or may be set to the value "0" (blocks 94, 96 in FIG. 5). As noted earlier, the broadcast message may be an existing broadcast message or a newly-defined broadcast message. In the LCM function, the network entity 38 may include a Group_Bitmap field, a Common_Probability_Threshold field (containing a probability threshold value applicable to all UEs regardless of their grouping) or a Group-Specific_Probability_Threshold field (containing multiple probability threshold values—one for each group enabled in the Group_Bitmap field), and a Retention Timer field (blocks 106 and 122 in FIG. 5).

(2) All idle UEs in the secondary RAT receive the broadcast message with the LCM function. In response, the UEs that belong to the groups that have the corresponding bitmap field set to "1" may activate an inter-RAT load balance function that controls reselection of the primary RAT. Thus, through the LCM function, the network entity 38 may "trigger" the idle UEs to activate the inter-RAT load-balancing functionality that will enable the idle UEs to attempt to re-select the primary RAT. Each (idle) UE (form the "enabled" groups) that decides to reselect the primary RAT may generate a UE-specific random value and compare it with the received Common_Probability_Threshold value or the Group-Specific_Probability_Threshold value associated with the UE's group number (block 108). The LCM function may trigger each of these UEs (i.e., the UEs that decide to reselect the primary RAT) to generate a UE-specific random value in response to that UE's activation of the inter-RAT load-balancing functionality.

(3) The UEs in the non-enabled groups (i.e., groups whose corresponding bitmap values are set to "0") may not activate the inter-RAT load balancing function and also disable any existing inter-RAT reselection functions. These UEs skip the steps (4) and (5) discussed below. Thus, through the Group_Bitmap field, the network entity 38 may control a UE's activation/de-activation of the inter-RAT load-balancing functionality.

(4) The UEs whose locally-generated random values are greater than or equal to the received Common_Probability_Threshold value or the applicable Group-Specific_Probability_Threshold value are considered to have passed the probability test. The UEs that pass the probability test may continue with the primary RAT reselection process (blocks 110, 112). These UEs may use Multi-Mode System Selection (MMSS) or Inter-RAT Neighbor List mechanism (like the earlier-mentioned OtherRATNeighborList message from the 3GPP2 document) or other similar means (e.g., a Preferred Roaming List (PRL)) to continue the reselection process. An idle UE that is able to select and camp on the primary RAT may stop the procedure here (as indicated through the blocks 114 and 115 in FIG. 5). However, if a UE is not able to re-select the primary RAT, the UE may have to follow the retention timer requirements discussed below (and as shown at block 117 in FIG. 5).

It is noted here that, in one embodiment, if the broadcast message does not include any probability threshold value (the "no" answers at decision blocks 106 and 122, leading to block 112), then all idle UEs in the secondary RAT that are qualified to perform primary RAT reselection may be free to perform primary RAT reselection at block 112. If the broadcast message also does not include a retention timer, then the UEs failing to reselect the primary RAT (at block 114) may simply wait for the next broadcast message (which may contain one or more probability threshold values and a retention timer value) as indicated through the sequence of blocks 117, 118, and 94, or may simply perform another reselection attempt (without waiting for another broadcast message) based on how those UEs are programmed/provisioned for primary RAT reselection.

(5) In one embodiment, an idle UE that does not pass the probability test (at block 110) will not be allowed to perform another primary RAT reselection. Such prevention may be accomplished via the retention timer (also referred to herein as "delay timer"). In one embodiment, the broadcast message may contain the retention timer as mentioned above. The probability-test-failing UE may activate the retention timer (block 117), but may have to wait until the retention timer expires before that UE is allowed (by the network entity 38) to reselect the primary RAT again (block 118) through another iteration of the probability test-related steps—resulting from activation of the inter-RAT load-balancing procedure—using one or more new probability threshold values transmitted via another broadcast message (blocks 94, 96, 106 or 122, 108, etc. in FIG. 5). Thus, in this embodiment, the broadcast message may contain a retention timer and a UE may store the retention timer in its memory (e.g., the memory 177 in FIG. 8). If the UE fails a reselection attempt, the LCM function may configure the UE such that the UE does not perform another inter-RAT load-balancing procedure (and, hence, another primary RAT re-selection attempt) until after the delay timer expires. As mentioned before, instead of such UE-based retention timer, in one embodiment, a network-based retention timer may be employed. In such an embodiment, the network (e.g., at the base station 38) may maintain the retention timer and the broadcast message may be without such a timer. The network entity 38 may activate the retention timer when the broadcast message is sent. The UEs that fail the random test may not perform another inter-RAT load-balancing procedure and may have to wait for another broadcast message from the network entity (containing one or more new probability threshold values at either block 106 or block 122) before attempting to reselect the primary RAT again. When the retention timer expires, the network entity 38 may send a new broadcast message with one or more new probability threshold values and with an indication to trigger a UE to perform primary RAT reselection again (with the assumption that the UE has already failed the first reselection attempt and was disallowed to perform another reselection until instructed otherwise from the network entity 38).

It is noted here that a UE may abandon the inter-RAT load-balancing procedure altogether if the UE is not able to camp on the secondary RAT (e.g., the secondary RAT system becomes unavailable, or pilot strength of secondary RAT becomes too weak to maintain a connection), as indicated at decision block 120 in FIG. 5.

(6) In one embodiment, subsequently broadcasted LCM function may change the values in the Group_Bitmap field so as, for example, to provide the idle UEs from previously-disabled groups a chance to reselect the primary RAT. If the content of the Group_Bitmap field is changed, all idle UEs may need to follow the procedures starting with step (2) (discussed above).

(7) The UEs in the secondary RAT may consider the inter-RAT load-balancing function to be de-activated if the LCM function is not broadcasted or if none of the related fields (e.g., probability threshold value(s) or retention timer (if applicable)) are included in the broadcasted LCM function (block 105 in FIG. 5). If the inter-RAT load-balancing function is considered to be de-activated, the idle UEs may use the existing OtherRATNeighbor process to determine when to reselect to the primary RAT. As noted earlier, such existing process is defined and discussed at length in the 3GPP2 Document.

As noted earlier, the discussion of FIG. 6-7 below assumes that the primary RAN/RAT is an LTE E-UTRAN, whereas its corresponding secondary RAN/RAT is an EV-DO based eAN. The teachings of the present disclosure apply to other combinations of primary and secondary RANs/RATs as well.

Figure 6:
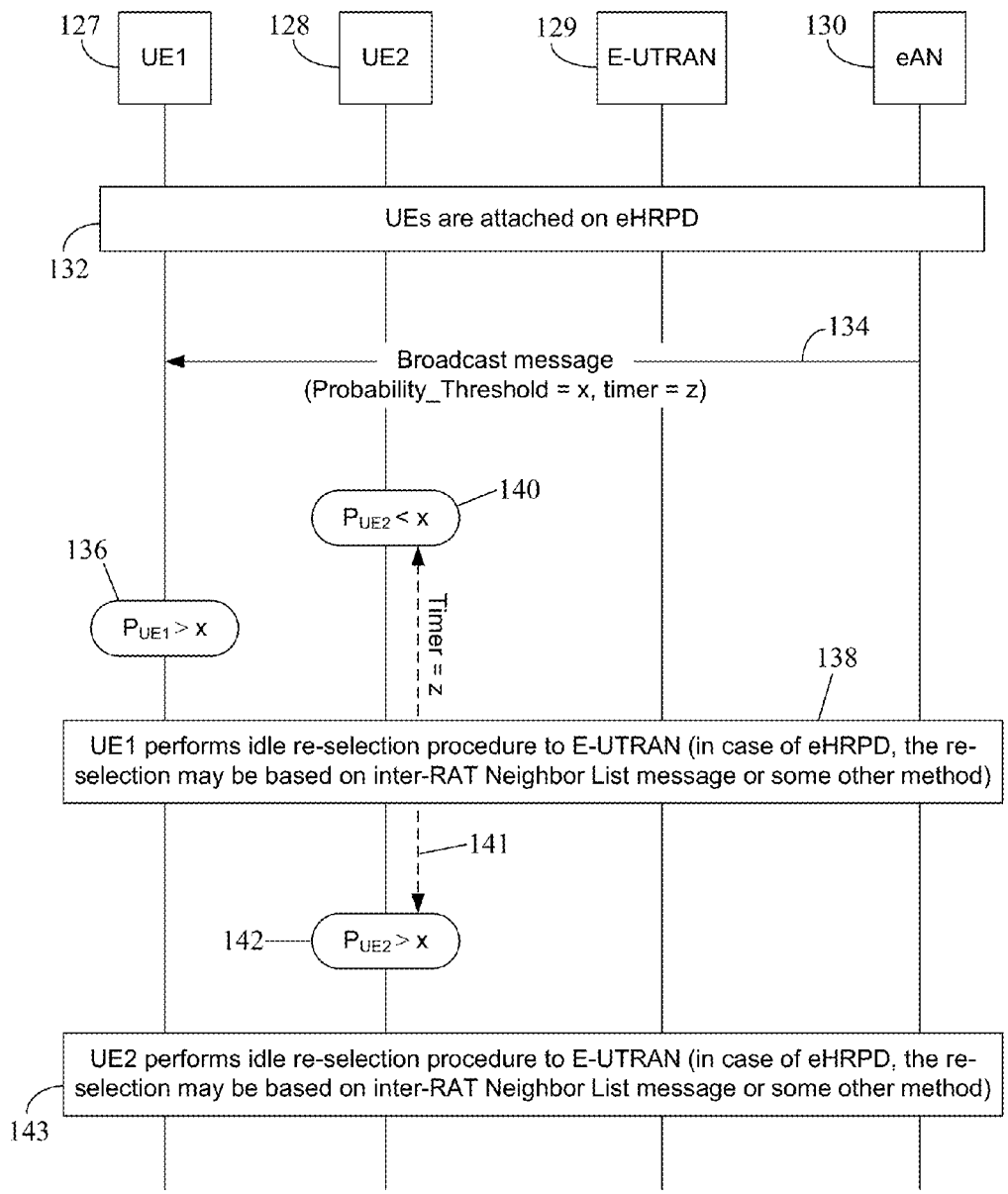
FIG. 6 depicts an exemplary call flow of how a retention timer may be implemented in the context of a common probability threshold value according to one embodiment of the present disclosure.

FIG. 6 depicts an exemplary call flow 125 of how a retention timer may be implemented in the context of a common probability threshold value (e.g., the embodiment illustrated in FIG. 3A) according to one embodiment of the present disclosure. In FIG. 6, four entities are shown—a first UE (UE1) 127, a second UE (UE2) 128, the primary RAN (E-UTRAN) 129, and the secondary RAN (eHRPD based eAN) 130. Each of the UEs 127-128 may be a multi-mode enabled device similar to the UE 34 and, hence, is not described in further detail herein. The entities 127-130 may be part of an operator's network (like the network 25 in FIG. 2). Thus, the primary RAN 129 may be analogized with the primary RAN 27 in FIG. 2, and the secondary RAN 130 may be analogized with the secondary RAN 28 in FIG. 2. As shown at block 132 in FIG. 6, the UEs 127-128 may be initially attached to the secondary RAN 130 and receiving wireless communication over the secondary RAT (here, eHRPD). These UEs 127-128 may be in an idle state. At step 134, a network entity (e.g., a BTS or an eBTS) in the secondary RAN 130 may send a broadcast message containing a common probability threshold value of "x" (applicable to all UEs in the secondary RAT regardless of grouping of the UEs) and a retention timer having value "z." As discussed before, the broadcast message may trigger each UE 127-128 to activate the inter-RAT load-balancing functionality. In response to such activation, each UE 127-128 may locally generate a (device-specific) random value. In case of the UE1, the generated random value ($P_{UE1}$) is greater than the received probability threshold value "x" (block 136) and, hence, the UE1 may be allowed to perform idle re-selection to the primary RAT (block 138). As noted at block 138 and mentioned before, if the secondary RAT is eHRPD, the re-selection may be based on, for example, the Inter-RAT Neighbor List message or some other method. Referring now to the UE2, in case of the UE2, however, the device-generated random value ($P_{UE2}$) is less than the received probability threshold value "x" (block 140). As a result, the UE2 may not be allowed to attempt to idle reselect to the primary RAT until the retention timer runs out—as indicated by the dotted arrow 141 in FIG. 6. The retention timer may have been stored and executed at the UE2. After expiration of the retention timer, the UE2 may attempt to generate another random value. In one embodiment, the UE2 may not wait for another broadcast message from the secondary RAN to generate this second random value. Alternatively, in a different embodiment, the UE2 may be configured to wait for another broadcast message (with possibly a different value for retention timer) before attempting to generate a new random value. In any event, at the second attempt at block 142, the UE2 generates a random value ($P_{UE2}$) that is greater than the received common probability threshold value "x." Hence, UE2 now may be allowed to perform idle re-selection to the primary RAT (E-UTRAN), as indicated at block 143 in FIG. 6.

Figure 7:
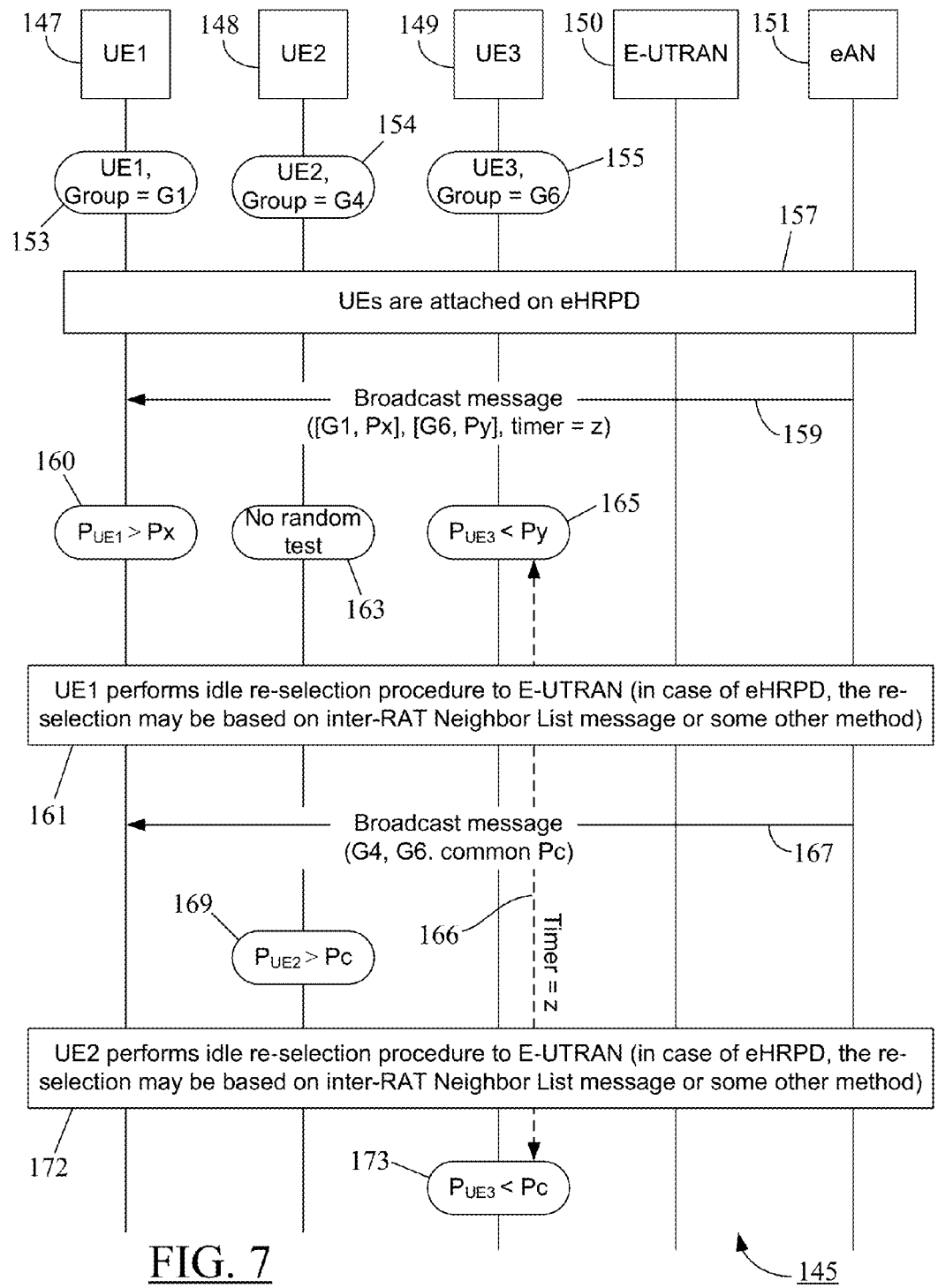
FIG. 7 shows an exemplary call flow of how a retention timer may be implemented in the context of group-specific probability values according to one embodiment of the present disclosure.

FIG. 7 shows an exemplary call flow 145 of how a retention timer may be implemented in the context of group-specific probability values (e.g., the embodiment illustrated in FIG. 3B) according to one embodiment of the present disclosure. In FIG. 7, five entities are shown—a first UE (UE1) 147, a second UE (UE2) 148, a third UE (UE3) 149, the primary RAN (E-UTRAN) 150, and the secondary RAN (eHRPD based eAN) 151. Each of the UEs 147-149 may be a multi-mode enabled device similar to the UE 34 and, hence, is not described in further detail herein. The entities 147-151 may be part of an operator's network (like the network 25 in FIG. 2). Thus, the primary RAN 150 may be analogized with the primary RAN 27 in FIG. 2, and the secondary RAN 151 may be analogized with the secondary RAN 28 in FIG. 2. In the embodiment of FIG. 7, the UEs operating over the secondary RAT are pre-provisioned into groups. Thus, each of the UEs 147-149 is assigned a group number—the UE1 belongs to group "G1" (block 153), the UE2 belongs to group "G4" (block 154), and UE3 belongs to group "G6" (block 155). As shown at block 157 in FIG. 7, the UEs 147-149 may be initially attached to the secondary RAN 151 and receiving wireless communication over the secondary RAT (here, eHRPD). These UEs 147-149 may be in an idle state. At step 159, a network entity (e.g., a BTS or an eBTS) in the secondary RAN 151 may send a broadcast message containing one or more group-specific probability threshold values (applicable to only those UEs that belong to the identified groups) and a retention timer having value "z." The broadcast message here individually identifies each group using the group number (instead of a bitmap). Thus, in the broadcast message at step 159, groups G1 and G6 are specifically identified and corresponding probability threshold values "Px" and "Py" are provided. As discussed before, the broadcast message may trigger each UE 147 and 149 from the identified groups to activate the inter-RAT load-balancing functionality. In response to such activation, each enabled UE 147, 149 may locally generate a (device-specific) random value. In case of the UE1, as noted at block 136, the generated random value ($P_{UE1}$) is greater than the received probability threshold value "Px" for the group (G1) to which the UE1 belongs (block 136) and, hence, the UE1 may be allowed to perform idle re-selection to the primary RAT (block 161). As noted at block 161 and mentioned before, if the secondary RAT is eHRPD, the re-selection may be based on, for example, the Inter-RAT Neighbor List message or some other method.

The UE2, however, cannot perform the random test (block 163) and remains at the secondary RAT because UE2's group—i.e., group G4—is not one of the groups that is enabled in the broadcast message at step 159. On the other hand, UE3's group (i.e., group G6) is an identified group in the broadcast message and, hence, UE3 is allowed to perform the load-balancing function and generate a random value. However, in case of the UE3, the device-generated random value ($P_{UE3}$) is less than the received probability threshold value "Py" (block 165). As a result, the UE3 may not be allowed to attempt to idle reselect to the primary RAT until the retention timer runs out—as indicated by the dotted arrow 166 in FIG. 7. The retention timer may have been stored and executed at the UE3. In the meantime, while the retention timer for UE3 runs out, the network entity in the secondary RAN 151 may send another broadcast message (at step 167) specifically identifying groups "G4" and "G6" and providing a common probability threshold value "Pc" applicable to all UEs in these two identified groups. In response to this new broadcast message, the UE2 may now activate the inter-RAT load-balancing functionality because UE2's groups—i.e., group "G4"—is now enabled in the broadcast message. In response to such activation, the UE2 may locally generate a (device-specific) random value. In case of the UE2, as noted at block 169, the generated random value ($P_{UE2}$) is greater than the received common probability threshold value "Pc" (block 169) and, hence, the UE2 may be allowed to perform idle re-selection to the primary RAT (block 172). As noted at block 172 and mentioned before, if the secondary RAT is eHRPD, the re-selection may be based on, for example, the Inter-RAT Neighbor List message or some other method.

Although the broadcast message at step 167 identifies UE3's group—i.e., group "G6"—the UE3 may not initiate another random test because the earlier delay timer has still not run out (as can be seen from the arrow 166 in FIG. 7). After expiration of the retention timer, however, the UE3 may now attempt to generate another random value. As mentioned earlier, in one embodiment, the UE3 may not wait for another broadcast message from the secondary RAN to generate this second random value. Alternatively, in a different embodiment, the UE3 may be configured to wait for another broadcast message (with possibly a different value for retention timer) before attempting to generate a new random value. In any event, in the embodiment of FIG. 7, there is already a second broadcast message (at step 167) that would allow the UE3 to activate the inter-RAT load balancing functionality (because UE3's group—i.e., group "G6"—is one of the enabled groups in the broadcast message) and generate a device-specific random value. At the second attempt (at block 173), the UE3 generates a random value ($P_{UE3}$) that is still less than the received common probability threshold value "Pc." Hence, the UE3 may have to start the retention timer process again (not shown in FIG. 7) and will be prevented from idle re-selecting the primary RAT (E-UTRAN) until that timer expires.

Thus, as illustrated in the exemplary call flow 145 in FIG. 7, different group-specific probability threshold values or a common probability threshold value may be used in a broadcast message that designates particular groups of UEs as "enabled" groups. Through the broadcast message, the network entity in the secondary RAN may thus provide inter-RAT load-balancing through selective enablement of different groups of UEs for idle re-selection to the primary RAT, while enforcing retention timer requirements for UEs that fail the probability test.

Figure 8:
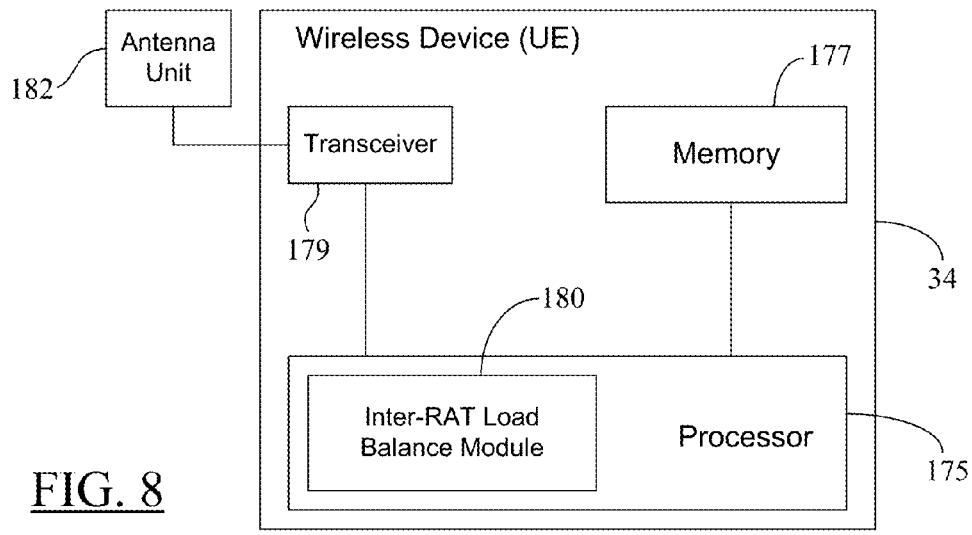
FIG. 8 shows a block diagram of an exemplary wireless device according to one embodiment of the present disclosure.

FIG. 8 shows a block diagram of an exemplary wireless device (e.g., the wireless device 34 in FIG. 2) according to one embodiment of the present disclosure. As noted earlier, the wireless device 34 may be a UE, an Access Terminal (AT), an M2M device, or any other mobile or stationary wireless terminal capable of operating over a primary RAT and a secondary RAT. The wireless device 34 may include a processor 175, a memory 177 (which may, in some embodiments, also include memory on UE's Subscriber Identity Module (SIM) card), and a transceiver 179. The processor 175 may include an inter-RAT load balance module 180. Upon execution of the program code of the module 180 by the processor 175, the processor may configure the wireless device 34 to perform various functions illustrated in FIG. 4 and discussed in more detail with reference to FIGS. 3-7.

The memory 177 may store data or other related communications received from the network entity (e.g., the base station 38) in the secondary RAN 28. For example, in one embodiment, the memory 177 may store a probability threshold value and a retention timer value received from the base station 38. These data may be later used by the processor 175 to determine whether the processor 175 is allowed to perform primary RAT re-selection for the wireless device 34.

The transceiver 179 may communicate with the processor 175 to perform transmission/reception of data, control, or other signaling information (via an antenna unit 182) to/from the network entities in the primary RAN 27 and the secondary RAN 28 with which the wireless device 34 may be in communication (using appropriate RAT such as, for example, eHRPD, E-UTRA, etc.). The transceiver 179 may be a single unit or may comprise of two separate units—a transmitter (not shown) and a receiver (not shown). In the embodiment of FIG. 2, only the secondary RAN 28 is shown with a network entity 38, but it is evident that a similar network entity also may be present in the primary RAN 27 and in communication with the wireless device 34 through the transceiver 179. The antenna unit 182 may include one or more antennas. Alternative embodiments of the wireless device 34 may include additional components responsible for providing additional functionality, including any of the functionality identified herein (such as, for example, receiving a broadcast message from a network entity, activating an inter-RAT load-balancing functionality, generating a random value and performing the probability test, attempting idle re-selection of the primary RAT, etc.) and/or any functionality necessary to support the solution as per the teachings of the present disclosure.

In one embodiment, the wireless device 34 may be configured (in hardware, via software, or both) to implement device-specific aspects of inter-RAT load-balancing and congestion control as per teachings of the present disclosure. The software or program code may be stored as part of the module 180 and executable by the processor 175 in response to receiving a broadcast message (e.g., a broadcast message including an LCM function as shown at block 94 in FIG. 5) from the secondary RAN-based network entity 38. For example, when existing hardware architecture of the device 34 cannot be modified, the functionality desired of the device 34 may be obtained through suitable programming of the processor 175 using the module 180. The execution of the program code (by the processor 175) may cause the processor to perform as needed to support the inter-RAT load-balancing and congestion control solution as per the teachings of the present disclosure. Thus, although the wireless device 34 may be referred to as "performing," "accomplishing," or "carrying out" (or similar such other terms) a function or a process or a method step, such performance may be technically accomplished in hardware and/or software as desired. The network operator or a third party (e.g., manufacturer or supplier of the device 34) may suitably configure the device 34 (e.g., through hardware and/or software based configuration of the processor 175) to operate and reciprocate with the network entity 38 as per the particular requirements of the present disclosure discussed above. For example, the device 34 may be configured to activate inter-RAT load-balancing functionality upon receiving a "trigger" in the form of a broadcast message from the network entity 38 in the secondary RAN 28. As a result, the device 34 may be configured to perform primary RAT re-selection or redirection under the control of the network entity 38 so as to accomplish desired inter-RAT load-balancing and congestion control. Similarly, in one embodiment, the module 180 may configure the processor 175 to request idle re-selection or switching to the primary RAT (as discussed with reference to block 102 in FIG. 5) even when a congestion indicator is set to "1" in the broadcast message from the network entity 38.

Figure 9:
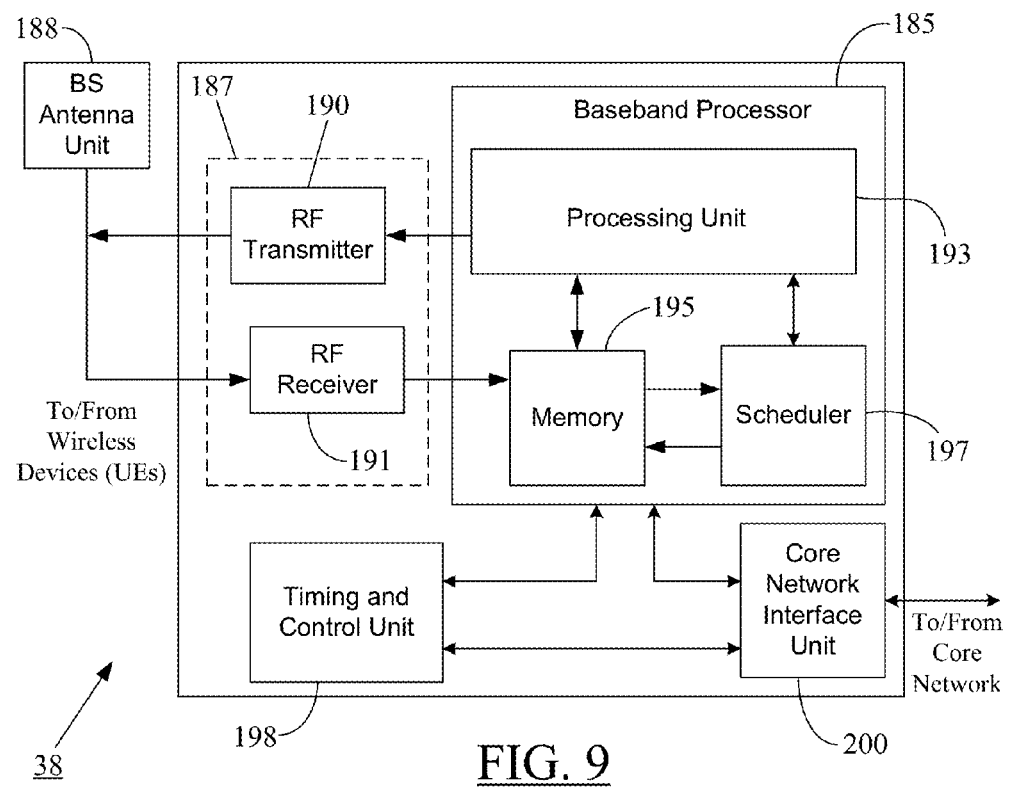
FIG. 9 depicts a block diagram of an exemplary network entity according to one embodiment of the present disclosure.

FIG. 9 depicts a block diagram of an exemplary network entity (e.g., the network entity 38 in FIG. 2) according to one embodiment of the present disclosure. As mentioned earlier, the network entity 38 may be a BTS or eBTS when the secondary RAN is eAN (or may be an eNodeB or eNB if the secondary RAN is E-UTRAN), or a similar wireless access node (or base station). The network entity 38 may be configured to send a broadcast message (containing a congestion indicator or other non-congestion related parameters such as one or more probability threshold values, a retention timer, etc.) to the wireless device 34 and, through the broadcast message, "trigger" or "instruct" the wireless device 34 to stop primary RAT re-selection attempts (if primary RAT congestion is reported) or to attempt idle re-selection only when the device 34 passes a probability test, as discussed in detail with reference to FIGS. 3-7.

The base station 38 may include a baseband processor 185 to provide radio interface with the wireless device 34 (in the carrier network 25 in FIG. 2) via base station's Radio Frequency (RF) transceiver unit 187 coupled to the base station's antenna unit 188. The transceiver unit 187 may include RF transmitter 190 and RF receiver 191 units coupled to the antenna unit 188 as shown. In one embodiment, the processor 185 may receive transmissions (e.g., uplink and/or downlink channel condition related information, neighboring cell measurement reports, requests for idle re-selection or switching to the primary RAT, etc.) from the wireless device 34 via the combination of the antenna unit 188 and the receiver 191, whereas the base station's transmissions (e.g., a broadcast message with congestion indicator or other non-congestion related parameters, scheduling-related messages, etc.) to the wireless device 34 may be carried out via the combination of the antenna unit 188 and the transmitter 190.

The processor 185 may be configured (in hardware and/or software) to generate an appropriate broadcast message to control attempts by the wireless device 34 to idle re-select or switch to the primary RAT as per the teachings of the present disclosure so as to accomplish inter-RAT load-balancing and congestion control as discussed earlier. In that regard, the processor 185 may include a processing unit 193 coupled to a memory 195 and a scheduler 197 to enable the processor 185 to perform various steps illustrated in FIGS. 3A-3C and 5-7 and discussed in detail hereinbefore. In one embodiment, the memory 195 may be a separate unit—i.e., not an internal part of the processor 185 (as in FIG. 9), but coupled to it to provide requisite storage. The memory 195 may contain program code that, upon execution by the processing unit 237, may configure the processor 185 to perform various steps discussed hereinbefore with reference to FIGS. 3A-3C and 5-7. For example, the processing unit 193 may execute the program code to generate contents for a broadcast message (e.g., appropriate probability threshold value(s), retention timer value(s), etc.) and have the broadcast message transmitted to the wireless device 34 (and other wireless devices operating in the secondary RAT 28) through the transceiver unit 187 (with the help of the base station antenna unit 188). Similarly, in case of a network-based retention timer (discussed hereinbefore), the memory 195 may store the retention timer value, and the processing unit 193 may activate the timer (as per the value retrieved from the memory 195) to control repeated attempts by wireless devices (in the secondary RAT) to idle re-select to the primary RAT 27.

The processing unit 193 may be in communication with the memory 195 to process and store relevant information for the corresponding RAN cell (e.g., identities of UEs or wireless devices operating within the cell, channel condition reports and/or neighbor cell measurement reports received from wireless devices, probability threshold values, etc.). A scheduler (e.g., the scheduler 197 in FIG. 9) may be part of the base station's 38 processor 185 and may provide the Uplink (UL) and Downlink (DL) scheduling decisions for the wireless device 34 based on a number of factors such as, for example, QoS (Quality of Service) parameters, device buffer status, UL and DL channel condition related information received from device 34, device capabilities, etc. In one embodiment, the network entity 38 may include separate UL and DL schedulers (not shown in FIG. 9) as part of its baseband processor 185. The scheduler 197 may have the same data structure as a typical scheduler in an eNB in an LTE system. The processor 185 may also provide additional baseband signal processing (e.g., mobile/wireless device registration, channel signal information transmission, radio resource management, etc.) as required. The processing unit 193 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The processor 185 may employ distributed processing in certain embodiments.

Some or all of the functionalities described above (e.g., generation of a broadcast message with congestion indicator or relevant non-congestion related parameters like one or more probability threshold values, transmission of the broadcast message to the wireless device 34, reception of device-specific requests for idle re-selection or switching to the primary RAT, etc.) as being provided by a base station or another network entity having similar functionality (such as a wireless access node/point, a base station controller, and/or any other type of mobile communications node) may be provided by the processing unit 193 executing instructions stored on a computer-readable data storage medium, such as the memory 195 shown in FIG. 9.

The network entity 38 may further include a timing and control unit 198 and a core network interface unit 200 as illustrated in FIG. 9. The control unit 198 may monitor operations of the processor 185 and the network interface unit 200, and may provide appropriate timing and control signals to these units. The interface unit 200 may provide a bi-directional interface for the base station 38 to communicate with its core network (or other network-based control entity) to facilitate administrative and call/data-management functions for mobile subscribers operating in the corresponding RAN (e.g., the secondary RAN 28 in FIG. 2) of the carrier network (e.g., the operator network 25 in FIG. 2).

Alternative embodiments of the base station 38 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the methodology provided herein (related to inter-RAT load-balancing and congestion control) may be implemented in a computer program, software, or firmware incorporated in a computer-readable storage medium (e.g., the memory 177 in FIG. 8 and/or the memory 195 in FIG. 9) for execution by a general purpose computer or a processor (e.g., the processor 175 in FIG. 8 or the processing unit 193 in FIG. 9). Examples of computer-readable storage media include a Read Only Memory (ROM), a Random Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 195 may employ distributed data storage with/without redundancy.

The foregoing describes a system and method to perform load-balancing and congestion control between a primary RAT and a secondary RAT. A network entity in the secondary RAN may send a broadcast message to all UEs operating under the secondary RAT. If the primary RAT is congested, the broadcast message may include a congestion indicator, which would prevent the UEs in the secondary RAT from idle re-selecting or switching to the primary RAT. Even if the primary RAT is not congested, the broadcast message may still include one or more non-congestion related parameters (or sub-functions) such as one or more probability threshold values, group bitmap or group numbers for the groups into which the UEs may have been divided, and a retention (or delay) timer. There may be a common probability value applicable to all UEs in the secondary RAT, or there may be group-specific probability values applicable to all UEs in a particular group. The idle UEs in the secondary RAT may generate device-specific random values and compare them against the applicable probability threshold value(s). If an idle UE passes this probability test, it is allowed to reselect the primary RAT. However, if the idle UE fails the probability test, it may have to wait until the retention timer runs out before attempting again to reselect the primary RAT. Thus, through the broadcast message, the secondary RAN/RAT may provide a network-based control over loading and congestion of the primary RAT. The UEs in the secondary RAT may be suitably configured to process such broadcast messages and activate or de-activate an inter-RAT load-balancing functionality (when there are non-congestion parameters in the broadcast message) or disable their primary RAT re-selection functionality (when the broadcast message contains a congestion indicator).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method for providing inter-Radio Access Technology (RAT) load-balancing and congestion control when a wireless device attempts to attach to a primary RAT while receiving wireless communication over a secondary RAT that is different from the primary RAT, the method comprising performing the following steps using a network entity in a Radio Access Network (RAN) supporting the secondary RAT:

broadcasting a congestion indicator via a broadcast message to all wireless devices receiving wireless communication over the secondary RAT, wherein the wireless devices include:
 a set of idle wireless devices, wherein each idle wireless device has no traffic channel established over the secondary RAT, and
 a set of active wireless devices, wherein each active wireless device has a traffic channel established over the secondary RAT; and
through the congestion indicator, disabling a primary RAT re-selection functionality in each idle wireless device receiving the broadcast message, thereby preventing re-selection of the primary RAT by the idle wireless devices.

2. The method of claim 1, further comprising:
through the congestion indicator, disabling switching to the primary RAT for each active wireless device.

3. The method of claim 2, further comprising:
receiving at least one of the following:
- a first request from an idle wireless device to re-select the primary RAT despite being disabled therefor through the congestion indicator, and
- a second request from an active wireless device to switch to the primary RAT despite being disabled therefor through the congestion indicator; and selectively allowing either re-selection or switching to the primary RAT on a device-by-device basis, regardless of the previous transmission of the congestion indicator in the broadcast message.

4. A wireless device that is capable of wireless communication over a primary Radio Access Technology (RAT) and a secondary RAT that is different from the primary RAT, wherein the wireless device comprises:
- a transceiver configured to receive a broadcast message from a network entity in a Radio Access Network (RAN) supporting the secondary RAT, wherein the broadcast message contains a congestion indicator that indicates that the primary RAT is congested; and
- a processor coupled to the transceiver and configured to perform the following:
  - process the congestion indicator, and
  - as a result of processing the congestion indicator, disable a primary RAT re-selection functionality in the wireless device when the wireless device is in an idle state with no traffic channel established on the secondary RAT.

5. The wireless device of claim 4, wherein the processor is further configured to perform the following as a result of processing the congestion indicator:
- disable the wireless device from switching to the primary RAT when the wireless device is in an active state with a traffic channel established over the secondary RAT.

6. The wireless device of claim 5, wherein the processor is further configured to perform the following:
- request the network entity to allow one of the following regardless of the presence of the congestion indicator in the broadcast message:
- re-selection to the primary RAT when the wireless device is in the idle state; and
- switching to the primary RAT when the wireless device is in the active state.

* * * * *